(12) United States Patent
Peiffer et al.

(10) Patent No.: US 7,329,453 B2
(45) Date of Patent: *Feb. 12, 2008

(54) WHITE, HEATSEALABLE, PEELABLE POLYESTER FILM, PROCESS FOR ITS PRODUCTION AND ITS USE

(75) Inventors: Herbert Peiffer, Mainz (DE); Bart Janssens, Wiesbaden (DE); Gottfried Hilkert, Saulheim (DE); Paul Broemmel, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 490 days.

This patent is subject to a terminal disclaimer.

(21) Appl. No.: 10/984,918

(22) Filed: Nov. 9, 2004

(65) Prior Publication Data

US 2005/0100718 A1    May 12, 2005

(30) Foreign Application Priority Data

Nov. 10, 2003  (DE) .................................. 103 52 432

(51) Int. Cl.
| | |
|---|---|
| *B32B 27/08* | (2006.01) |
| *B32B 27/18* | (2006.01) |
| *B32B 27/20* | (2006.01) |
| *B32B 27/36* | (2006.01) |
| *B32B 37/15* | (2006.01) |

(52) U.S. Cl. ..................... 428/141; 428/34.9; 428/215; 428/216; 428/334; 428/335; 428/336; 428/323; 428/480; 428/910; 525/437; 525/444; 528/302; 528/308; 528/308.6; 528/308.7; 264/171.16; 264/171.19; 264/288.4; 264/290.2

(58) Field of Classification Search ...................... None
See application file for complete search history.

(56) References Cited

U.S. PATENT DOCUMENTS 4,252,885 A    2/1981    McGrail et al. ............ 430/160

(Continued)

FOREIGN PATENT DOCUMENTS

DE            109 224          11/1974

(Continued)

OTHER PUBLICATIONS

W. Hatke, Folien aus COC [COC Films], Kunststoffe, 87 (1997) 1, p. 58-62.

*Primary Examiner*—Vivian Chen
(74) *Attorney, Agent, or Firm*—ProPat, L.L.C.

(57) ABSTRACT

Coextruded, biaxially oriented polyester films which have a white base layer (B) and have a heatsealable outer layer (A) that can be peeled from APET/CPET and from CPET, where the outer layer (A) includes a) from 80 to 99% by weight of polyester and
   b) from 1 to 10% by weight of inorganic and/or organic particles with a median diameter $d_{50}$ of from 2.5 to 12 µm, and where c) the polyester is composed of from 12 to 89 mol % of units derived from at least one aromatic dicarboxylic acid and of from 11 to 88 mol % of units derived from at least one aliphatic dicarboxylic acid, and d) the ratio calculated from the particle size $d_{50}$ of the particles and the layer thickness $d_A$ of the outer layer (A) is greater than or equal to 1, and the base layer (B) comprises an inorganic white pigment and/or a polymer incompatible with polyester. The films of the invention are suitable as a packaging material for foods and other consumable goods or as a lid film for APET/CPET or CPET trays.

28 Claims, 3 Drawing Sheets

Peelable PET film

Sealable outer layer (A)

Ready-prepared meal

CPET tray

CPET tray with ready-prepared meal and film removable (peelable) from the tray

U.S. PATENT DOCUMENTS

| | | | |
|---|---|---|---|
| 4,375,494 A * | 3/1983 | Stokes | 428/323 |
| 4,675,582 A | 6/1987 | Hommes et al. | 318/38 |
| 4,825,111 A | 4/1989 | Hommes et al. | 310/12 |
| 4,853,602 A | 8/1989 | Hommes et al. | 318/38 |
| 4,922,142 A | 5/1990 | Givler, Jr. et al. | 310/12 |
| 5,036,262 A | 7/1991 | Schonbach | 318/38 |
| 5,051,225 A | 9/1991 | Hommes et al. | 264/288 |
| 5,072,493 A | 12/1991 | Hommes et al. | 26/72 |
| 5,416,959 A | 5/1995 | Forrest, Jr. | 26/73 |
| 5,458,965 A * | 10/1995 | Yoshinaka et al. | 428/323 |
| 5,747,174 A * | 5/1998 | Kimura et al. | 428/480 |
| 6,326,431 B1 * | 12/2001 | Peiffer et al. | 525/177 |
| 6,423,401 B2 * | 7/2002 | Peiffer et al. | 428/216 |
| 6,627,695 B2 * | 9/2003 | Murschall et al. | 524/513 |
| 6,635,340 B2 * | 10/2003 | Peiffer et al. | 428/308.4 |
| 6,649,247 B2 * | 11/2003 | Murschall et al. | 428/141 |
| 7,141,293 B2 * | 11/2006 | Peiffer et al. | 428/141 |
| 7,144,615 B2 * | 12/2006 | Peiffer et al. | 428/141 |
| 7,186,452 B2 * | 3/2007 | Peiffer et al. | 428/141 |
| 7,205,040 B2 * | 4/2007 | Peiffer et al. | 428/141 |
| 7,211,306 B2 * | 5/2007 | Peiffer et al. | 428/34.9 |
| 2002/0068158 A1 * | 6/2002 | Peiffer et al. | 428/220 |
| 2002/0160215 A1 * | 10/2002 | Peiffer et al. | 428/480 |
| 2004/0146727 A1 | 7/2004 | Gottfried et al. | 428/480 |
| 2004/0213966 A1 * | 10/2004 | Peiffer et al. | 428/202 |
| 2004/0213967 A1 * | 10/2004 | Peiffer et al. | 428/202 |
| 2004/0213968 A1 * | 10/2004 | Peiffer et al. | 428/202 |
| 2004/0229060 A1 * | 11/2004 | Peiffer et al. | 428/483 |
| 2005/0019559 A1 * | 1/2005 | Peiffer et al. | 428/336 |
| 2005/0042439 A1 * | 2/2005 | Peiffer et al. | 428/323 |
| 2005/0042441 A1 * | 2/2005 | Peiffer et al. | 428/336 |
| 2005/0042468 A1 * | 2/2005 | Peiffer et al. | 428/480 |
| 2005/0061708 A1 * | 3/2005 | Peiffer et al. | 206/557 |
| 2005/0074598 A1 * | 4/2005 | Peiffer et al. | 428/323 |
| 2005/0074599 A1 * | 4/2005 | Peiffer et al. | 428/323 |
| 2005/0074619 A1 * | 4/2005 | Peiffer et al. | 428/480 |
| 2005/0100718 A1 * | 5/2005 | Peiffer et al. | 428/200 |
| 2005/0100729 A1 * | 5/2005 | Peiffer et al. | 428/323 |
| 2005/0100750 A1 * | 5/2005 | Peiffer et al. | 428/482 |
| 2005/0118412 A1 * | 6/2005 | Peiffer et al. | 428/323 |
| 2005/0121822 A1 * | 6/2005 | Peiffer et al. | 264/173.16 |
| 2005/0173050 A1 * | 8/2005 | Peiffer et al. | 156/244.11 |

FOREIGN PATENT DOCUMENTS

| | | |
|---|---|---|
| DE | 237 070 A3 | 7/1986 |
| EP | 0 035 835 A1 | 9/1981 |
| EP | 0 144 878 | 11/1984 |
| EP | 0 144 948 | 12/1984 |
| EP | 0 156 464 A1 | 10/1985 |
| EP | 0 283 164 A2 | 9/1988 |
| EP | 0 296 620 A2 | 12/1988 |
| EP | 0 379 190 A1 | 7/1990 |
| EP | 0 379 190 A2 | 7/1990 |
| EP | 0 407 870 A2 | 1/1991 |
| EP | 0 485 893 A1 | 5/1992 |
| EP | 0 503 422 A1 | 9/1992 |
| EP | 1 471 098 A1 | 1/1993 |
| EP | 1 068 949 A1 | 1/2001 |
| EP | 1 176 005 A2 | 1/2002 |
| EP | 1 457 316 | 9/2004 |
| EP | 1 457 317 A1 | 9/2004 |
| EP | 1 471 094 * | 10/2004 |
| EP | 1 471 096 * | 10/2004 |
| EP | 1 471 097 * | 10/2004 |
| EP | 1 471 098 * | 10/2004 |
| EP | 1 475 229 A2 | 11/2004 |
| JP | 05-009319 A | 1/1993 |
| JP | 2001002800 A1 | 1/2001 |
| WO | WO 94/13476 A1 | 6/1994 |
| WO | WO 94/13481 A1 | 6/1994 |
| WO | WO 96/19333 A1 | 6/1996 |
| WO | WO 02/26493 A1 | 4/2002 |
| WO | WO 02/059186 | 8/2002 |
| WO | WO 02/059186 A1 | 8/2002 |
| WO | WO 03/026892 A1 | 4/2003 |
| WO | WO 03026892 S1 | 4/2003 |

* cited by examiner

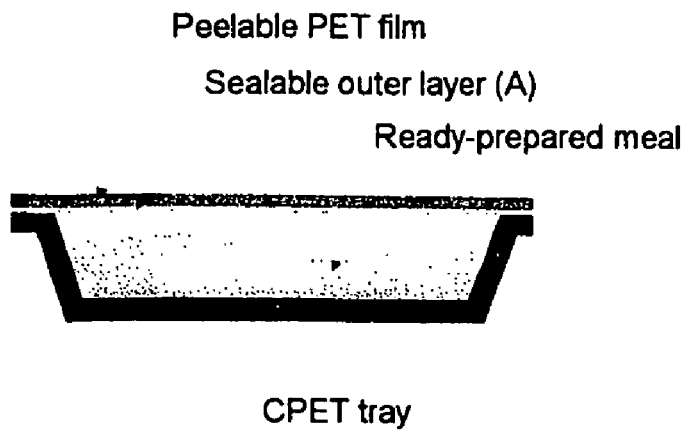
Figure 1 CPET tray with ready-prepared meal and film removable (peelable) from the tray
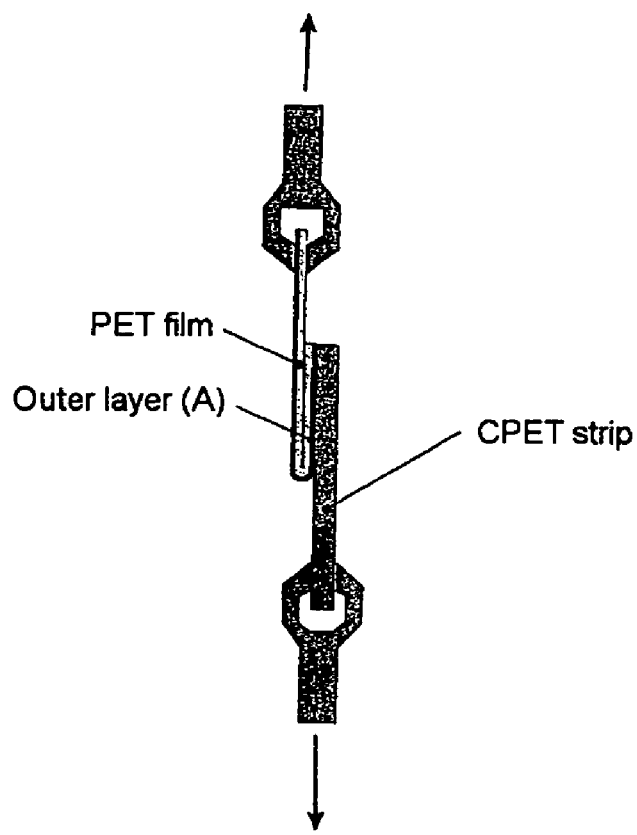
Figure 2 Arrangement of "peelable" film and strip of a CPET tray in a tensile strain tester

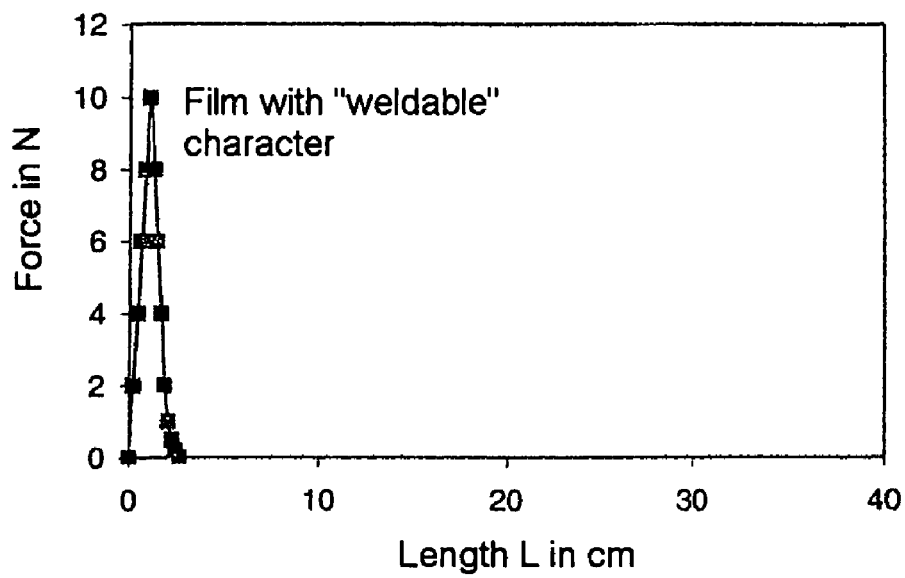
a) Film with "weldable" behavior
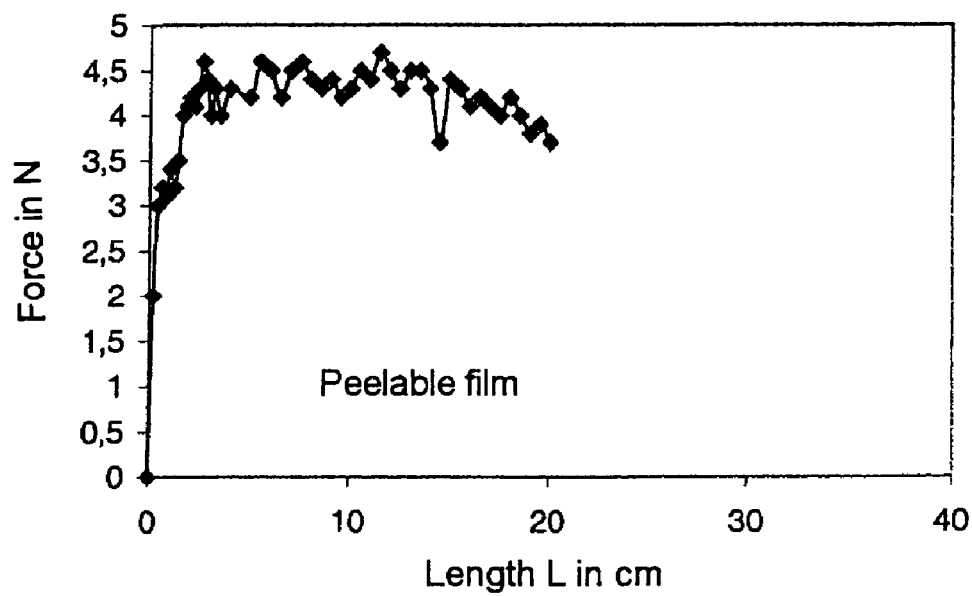
b) Film with "peelable" behavior
Figure 3 Tensile strain at break behavior of films with "weldable" and "peelable" behavior

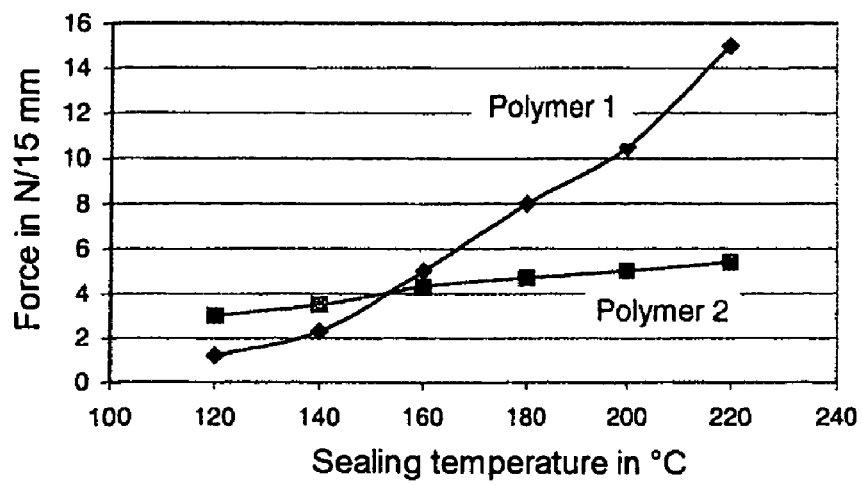
Figure 4   Tensile strain at break behavior of films with "weldable" and "peelable" behavior
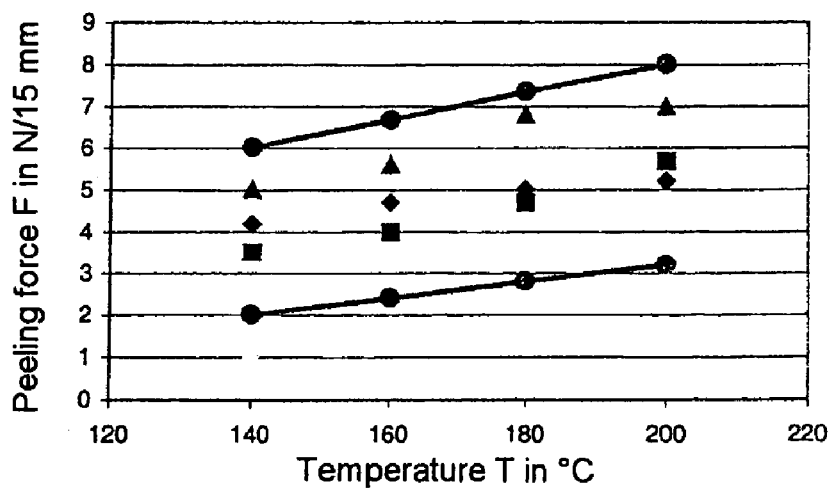
Figure 5   Correlation between sealing temperature in °C and peeling force in N/15 mm

WHITE, HEATSEALABLE, PEELABLE POLYESTER FILM, PROCESS FOR ITS PRODUCTION AND ITS USE

CROSS REFERENCE TO RELATED APPLICATIONS

This application claims priority to its parent application, German Patent Application 103 52 432.0, filed Nov. 10, 2003, hereby incorporated by reference herein in its entirety.

FIELD OF THE INVENTION

The invention relates to a white, coextruded, peelable and biaxially oriented polyester film having a white base layer (B) and at least one outer layer (A) applied to this base layer (B). The outer layer (A) is heatsealable and features easy to moderate peelability, especially to PET trays. The heatsealable and peelable outer layer (A) comprises polyester based on aromatic and aliphatic acids and aliphatic diols. In addition, the outer layer (A) comprises particles. The invention further relates to a process for producing the film and to its use.

BACKGROUND OF THE INVENTION

For ready-prepared meals, there are currently double-digit growth rates in Europe. The ready-prepared meals are transferred to trays after their preparation (cf. FIG. 1). A film which is heatsealed to the edge of the tray seals the packaging and protects the ready-prepared meal from external influences. The ready-prepared meals are suitable, for example, for heating in a microwave, for heating in a conventional oven or for heating in a microwave and in a conventional oven. In the latter case, the ready-prepared meal and the packaging have to be "dual ovenable" (=suitable for microwave and conventional ovens). As a consequence of the temperatures existing in the conventional oven (up to 220° C.), particularly high demands are made on the packaging material (tray and lid film).

Both for the tray and for the lid film, only selected materials can be considered for dual ovenable applications. Typical materials for the trays are in this case CPET, aluminum, cardboard coated with PET or with PET film. In the case of CPET trays (cf. FIG. 1), the thick crystalline and usually pigmented, i.e. particle-filled, CPET film provides the stability of the tray, even at the comparatively high temperatures in the conventional oven. APET/CPET trays include externally a CPET layer and internally, i.e. facing toward the ready-prepared meal, an APET layer. The amorphous PET essentially improves the adhesion of the film to the tray. PET=polyethylene terephthalate, APET=amorphous PET, CPET=crystalline PET.

In dual ovenable applications, the material used for the lid film is generally PET which is sufficiently dimensionally stable and solid even at 220° C. Materials such as PP or PE are ruled out from the outset because of their low melting points. The requirements on the lid film are best fulfilled by biaxially oriented polyester film.

When preparing the ready-prepared meal in the oven, the polyester film is removed by hand from the tray shortly before heating or shortly after heating. When this is done, the polyester film must on no account start to tear, start and continue to tear or tear off. The removal of the film from the tray without the film starting or continuing to tear or tearing off is also referred to in the foods industry as peeling. For this application, the polyester film therefore has to be not only heatsealable, but in particular also peelable. For a given material and given overall thickness of the film, the peelability of the film is determined mainly by the properties of the surface layer of the film which is sealed to the tray.

The peelability of films can be determined relatively simply in the laboratory using a tensile strain tester (for example from Zwick, Germany) (cf. FIG. 2). For this test, two strips of width 15 mm and length approx. 50 mm are first cut out of the polyester film and the tray and sealed to one another. The sealed strips are, as shown in FIG. 2, clamped into the clips of the tester. The "angle" between the film clamped in the upper clip and the tray strip is 180°. In this test, the clips of the tester are moved apart at a speed of 200 mm/min, and in the most favorable case the film is fully peeled off the tray (cf., for example, ASTM-D 3330).

In this test, a distinction is to be drawn between essentially two different mechanisms.

In the first case, the tensile force rises rapidly in the course of the pulling procedure up to a maximum (cf. FIG. 3a) and then falls directly back to zero. When the maximum force is attained, the film starts to tear or, before delamination from the tray, tears off, which results in the force falling immediately back to zero. The film is in this case not peelable, since it is destroyed. The behavior of the film can rather be described as a kind of "welding" to the tray. The destruction of the film on removal from the tray is undesired, because this complicates the easy opening of the packaging without tools such as scissors or knives.

In contrast, a peelable film is obtained when the tensile force or the peeling force rises up to a certain value (i.e. up to a certain plateau) and then remains approximately constant over the distance over which the two strips are sealed together (cf. FIG. 3b). In this case, the film does not start to tear, but rather can be peeled as desired off the tray with a low force input.

The size of the peeling force is determined primarily by the polymers used in the sealing layer (A) (cf. FIG. 4, polymer 1 and polymer 2). In addition, the size of the peeling force is dependent in particular on the heatsealing temperature employed. The peeling force generally rises with the heatsealing temperature. With increasing heatsealing temperature, the risk increases that the sealing layer might lose its peelability. In other words, a film which is peelable when a low heatsealing temperature is employed loses this property when a sufficiently high heatsealing temperature is employed. This behavior is to be expected in particular in the case of polymers which exhibit the characteristics shown in FIG. 4 for polymer 1. This behavior which tends to generally occur but is rather unfavorable for the application has to be taken into account when designing the sealing layer. It has to be possible to heatseal the film in a sufficiently large temperature range without the desired peelability being lost (cf. polymer 2 in FIG. 4). In practice, this temperature range is generally from 150 to 220° C., preferably from 150 to 200° C. and more preferably from 150 to 190° C.

The heatsealable and peelable layer is applied to the polyester film in accordance with the prior art, generally by means of offline methods (i.e. in an additional process step following the film production). This method initially produces a "standard polyester film" by a customary process. The polyester film produced in this way is then coated offline in a further processing step in a coating unit with a heatsealable and peelable layer. In this process, the heatsealable and peelable polymer is initially dissolved in an organic solvent. The final solution is then applied to the film by a suitable application process (knifecoater, patterned roller, die). In a downstream drying oven, the solvent is evaporated and the peelable polymer remains on the film as a solid layer.

Such an offline application of the sealing layer is comparatively expensive for several reasons. First, the film has to be coated in a separate step in a special apparatus. Second, the evaporated solvent has to be condensed again and recycled, in order thus to minimize pollution of the environment via the waste air. Third, complicated control is required to ensure that the residual solvent content in the coating is very low.

Moreover, in an economic process, the solvent can never be completely removed from the coating during the drying, in particular because the drying procedure cannot be of unlimited duration. Traces of the solvent remaining in the coating subsequently migrate via the film disposed on the tray into the foods where they can distort the taste or even damage the health of the consumer.

Various peelable, heatsealable polyester films which have been produced offline are offered on the market. The polyester films differ in their structure and in the composition of the outer layer (A). Depending on their (peeling) properties, they have different applications. It is customary, for example, to divide the films from the application viewpoint into films having easy peelability (easy peel), having moderate peelability (medium peel) and having strong, robust peelability (strong peel). The essential quantifiable distinguishing feature between these films is the size of the particular peeling force according to FIG. 3b. A division is undertaken at this point as follows:

| | |
|---|---|
| Easy peelability (easy peel) | Peeling force in the range of from about 1 to 4 N per 15 mm of strip width |
| Moderate peelability (medium peel) | Peeling force in the range of from about 3 to 8 N per 15 mm of strip width |
| Strong, robust peelability (strong peel) | Peeling force in the range of more than 5 N per 15 mm of strip width |

Some sealable PET films are already known.

EP-A-0 515 096 describes a coextruded, multilayer, sealable polyester film which comprises an additional additive on the sealable layer and features a corresponding topography (number of elevations and range for the average height of the elevations). The films may be white or transparent. The additive (=antiblocking agent) in the sealing layer may comprise, for example, inorganic particles and is preferably applied in an aqueous layer to the film in the course of its production. In addition, the additive may also be incorporated directly into the sealing layer. This is intended to allow the film to retain the good sealing properties and be efficiently processable. The reverse side of the film comprises preferably only very few, comparatively small particles which get into this layer principally via the regrind of the film itself. There are no data for the sealing temperature range of the film in this document. The seal seam strength is measured at 140° C. and is more than 200 N/m (corresponding to 3 N/15 mm of film width). For a 3 μm-thick sealing layer, a seal seam strength of 275 N/m (corresponding to 4.125 N/15 mm of film width) is reported.

EP-A-0 035 835 describes a coextruded sealable polyester film to which particles whose average particle size exceeds the layer thickness of the sealing layer are added in the sealing layer to improve the winding and processing performance. The polymer of the sealing film layer is substantially a polyester copolymer which is based on aromatic dicarboxylic acids and also aliphatic diols. The particulate additives form surface elevations which prevent undesired blocking and adhesion of the film to rolls or guides. The selection of particles having a diameter greater than the sealing layer worsens the sealing performance of the film. No information is given in the document on the sealing temperature range of the film. The seal seam strength is measured at 140° C. and is in the range from 63 to 120 N/m (corresponding to from 0.97 to 1.8 N/15 mm of film width). There are no indications in the document concerning the peeling performance of the film with respect to trays made of APET/CPET or CPET.

EP-A-0 379 190 describes a coextruded, biaxially oriented polyester film which comprises a carrier film layer of polyester and at least one sealing film layer of a polyester composition. The sealing film layer may comprise aliphatic and aromatic dicarboxylic acids and also aliphatic diols. The polymer for the sealing film layer comprises two different polyesters A and B, of which at least one (polyester B) contains aliphatic dicarboxylic acids and/or aliphatic diols. The sealing energy which is measured between two sealing film layers facing each other and joined together (=fin sealing) is more than 400 $g_{force}$·cm/15 mm (=more than 4 N·cm/15 mm), and the sealing film layer may comprise inorganic and/or organic fine particles which are insoluble in the polyester, in which case the fine particles are present in an amount of from 0.1 to 5% by weight, based on the total weight of the sealing film layer. In the examples of EP-A-0 379 190, organic particles, when they are used at all, are used in maximum amounts of 0.3% by weight. Although the film features good peeling properties (having plateau character in the peeling diagram [see above]) with respect to itself (i.e. sealing film layer with respect to sealing film layer), there is no information about the peeling performance with respect to trays made of APET/CPET and CPET. In particular, the film of this invention is in need of improvement in its producibility and its processibility (the raw materials tend to adhere).

WO A-96/19333 describes a process for producing peelable films, in which the heatsealable, peelable layer is applied inline to the polyester film. In the process, comparatively small amounts of organic solvents are used. The heatsealable, peelable layer comprises a copolyester which has a) from 40 to 90 mol % of an aromatic dicarboxylic acid, b) from 10 to 60 mol % of an aliphatic dicarboxylic acid, c) from 0.1 to 10 mol % of a dicarboxylic acid containing a free acid group or a salt thereof, d) from 40 to 90 mol % of a glycol containing from 2 to 12 carbon atoms and e) from 10 to 60 mol % of a polyalkyldiol. The coating is applied to the film from an aqueous dispersion or a solution which contains up to 10% by weight of organic solvent. The process is restricted with regard to the polymers which can be used and the layer thicknesses which can be achieved for the heatsealable, peelable layer. The maximum achievable layer thickness is specified as 0.5 μm. The maximum seal seam strength is low, and is from 500 to 600 g/25 mm², or [(from 500 to 600)/170] N/15 mm of film width.

WO 02/059186 A1 describes a process for producing peelable films, in which the heatsealable, peelable layer is likewise applied inline to the polyester film. The films may be white or transparent. In this case, the heatsealable, peelable layer is produced by employing melt-coating, and it is preferably the longitudinally stretched film which is coated with the heatsealable, peelable polymer. The heatsealable, peelable polymer contains polyesters based on aromatic and aliphatic acids, and also based on aliphatic diols. The copolymers disclosed in the examples have glass transition temperatures of below −10° C.; such copolyesters are too soft, which is why they cannot be oriented in customary roll stretching methods (adhesion to the rolls). The thickness of the heatsealable, peelable layer is less than 8 μm. In WO 02/059186 A1, the melt-coating known per se is delimited from the extrusion coating known per se technically and by the viscosity of the melt. A disadvantage of the process is that only comparatively fluid polymers (max. 50 Pa·s) having a low molecular weight can be used. This results in disadvantageous peeling properties of the film. Moreover, the coating rate in this process is limited, which makes the production process uneconomic. With regard to quality, faults are observed in the appearance of the film which are visible, for example, as coating strips. In this process, it is also difficult to obtain a uniform thickness of the sealing layer over the web width of the film, which in turn leads to nonuniform peeling characteristics.

SUMMARY OF THE INVENTION

It is an object of the present invention to provide a white, heatsealable and peelable, biaxially oriented polyester film which features outstanding peeling properties, in particular with respect to trays made of APET/CPET or CPET. Neither it nor its production process should any longer have the disadvantages of the prior art films and should in particular have the following features:

- an easy to moderate peelability (easy peel to medium peel) with respect to CPET and the APET side of trays made of APET/CPET. The peeling force should be in the range from 1 to 8 N per 15 mm, preferably in the range from 2.0 to 8 N per 15 mm and more preferably in the range from 2.3 to 8 N per 15 mm, of film strip width;
- no organic solvent residues are present in the heatsealable and peelable layer;
- the heatsealable and peelable layer, with respect to CPET trays and the APET side of APET/CPET trays, has a minimum sealing temperature of 165° C., preferably 160° C., more preferably 155° C., and a maximum sealing temperature of generally 220° C., preferably 200° C. and more preferably 190° C.;
- it is produced employing processes in which no organic solvents are used from the outset;
- the films have a high whiteness of >60, preferably >65, more preferably >70, and a low transparency (light transmission) of <60%, preferably <55%, more preferably <50%;
- the film can be produced economically. This also means, for example, that the film can be produced using stretching processes which are customary in the industry. In addition, it should be possible to produce the film at machine speeds of up to 500 m/min which are customary today;
- a good adhesion (preferably greater than 2 N/15 mm of film width) between the individual layers of the film is ensured for their practical employment;
- in the course of the production of the film, it is guaranteed that the regrind can be fed back to the extrusion in an amount of up to approx. 60% by weight, without significantly adversely affecting the physical (the tensile strain at break of the film in both directions should not decrease by more than 10%), but in particular the optical, properties of the film.

In addition, care should be taken that the film can be processed on high-speed machines. On the other hand, the known properties which distinguish polyester films should at the same time not deteriorate. These include, for example, the good mechanical (the modulus of elasticity of the biaxially stretched films in both orientation directions should be greater than 3000 N/mm$^2$, preferably greater than 3500 N/mm$^2$ and more preferably greater than 4000 N/mm$^2$) and the thermal properties (the shrinkage of the biaxially stretched films in both orientation directions should not be greater than 3%, preferably not greater than 2.8% and more preferably not greater than 2.5%), the winding performance and the processibility of the film, in particular in the printing, laminating or in the coating of the film with metallic or ceramic materials.

Heatsealable refers here to the property of a coextruded, multilayer polyester film which has at least one base layer (B) and has at least one outer layer (=heatsealable outer layer) which can be bonded by means of sealing jaws by applying heat (140 to 220° C.) and pressure (2 to 5 bar) within a certain time (0.2 to 2 s) to itself (fin sealing), or to a substrate made of a thermoplastic (=lap sealing, here in particular to CPET and APET/CPET trays), without the carrier layer (=base layer) itself becoming plastic. In order to achieve this, the polymer of the sealing layer generally has a distinctly lower melting point than the polymer of the base layer. When the polymer used for the base layer is, for example, polyethylene terephthalate having a melting point of 254° C., the melting point of the heatsealable layer is generally less than 230° C., in the present case preferably less than 210° C. and more preferably less than 190° C.

Peelable refers here to the property of the inventive polyester film which comprises at least one layer (=heatsealable and peelable outer layer), after heatsealing to a substrate, of being able to be pulled from the substrate in such a way that the film neither starts to tear nor tears off. The bond of heatsealable film and substrate breaks in the seam between the heatsealed layer and substrate surface when the film is removed from the substrate (cf. also Ahlhaus, O. E.: Verpackung mit Kunststoffen [Packaging with plastics], Carl Hanser Verlag, p. 271, 1997, ISBN 3-446-17711-6). When the film heatsealed to a test strip of the substrate is removed in a tensile strain testing instrument at a peeling angle of 180° in accordance with FIG. 2, the tensile strain behavior of the film according to FIG. 3b is then obtained. On commencement of the peeling of the film from the substrate, the force required for this purpose rises, according to FIG. 3b, up to a certain value (e.g. 4 N/15 mm) and then remains approximately constant over the entire peeling operation, but is subject to larger or smaller variations (approx. ±20%)

BRIEF DESCRIPTION OF THE DRAWINGS

FIG. 1 is a schematic illustration of an exemplary sealed tray;

FIG. 2 is a schematic illustration of a tensile strain measuring technique;

FIG. 3a is an exemplary diagram of tensile strain at break for a film having weldable behavior;

FIG. 3b is an exemplary diagram of tensile strain at break for a film having peelable behavior;

FIG. 4 is an exemplary diagram of tensile strain at break for films having weldable and peelable behavior;

FIG. 5 is an exemplary diagram of the correlation between sealing temperature and peeling force.

DETAILED DESCRIPTION OF THE INVENTION

The object is achieved by providing a white, coextruded, biaxially oriented polyester film which has a white base layer (B) and has a heatsealable outer layer (A) that can be peeled at least from APET/CPET and from CPET, where the outer layer (A) comprises a) from 80 to 99% by weight of polyester and b) from 1 to 10% by weight of inorganic and/or organic particles with a median diameter $d_{50}$ of from 2.5 to 12.0 µm (based in each case on the mass of the outer layer (A)), and where c) the polyester is composed of from 12 to 89 mol % of units derived from at least one aromatic dicarboxylic acid and of from 11 to 88 mol % of units derived from at least one aliphatic dicarboxylic acid, where the total of the dicarboxylic-acid-derived molar percentages is 100, and d) the ratio calculated from the particle size $d_{50}$ and the layer thickness $d_A$ of the outer layer (A) is greater than or equal to 1.

The thickness of the outer layer (A) $d_A$ is from 0.7 to 10.0 µm.

To achieve the desired whiteness and the desired low transparency (light transmission), the base layer (B) comprises an inorganic pigment or a polymer incompatible with polyester or a combination of the two. It is also possible to use a plurality of inorganic pigments and/or a plurality of polymers incompatible with polyester.

The abovementioned parameters are each to be regarded as preferred values.

The material of the outer layer (A) thus includes predominantly a polyester and inorganic and/or organic particles. The polyester is composed of units which are derived from aromatic and aliphatic dicarboxylic acids. The units which derive from the aromatic dicarboxylic acids are present in the polyester in an amount of from 12 to 89 mol %, preferably from 30 to 84 mol %, more preferably from 40 to 82 mol %. The units which derive from the aliphatic dicarboxylic acids are present in the polyester in an amount of from 11 to 88 mol %, preferably from 16 to 70 mol %, more preferably from 18 to 60 mol %, and the molar percentages always add up to 100%. The diol units corresponding thereto likewise always make up 100 mol %.

Preferred aliphatic dicarboxylic acids are succinic acid, pimelic acid, suberic acid, azelaic acid, sebacic acid, glutaric acid and adipic acid. Particular preference is given to azelaic acid, sebacic acid and adipic acid.

Preferred aromatic dicarboxylic acids are terephthalic acid; isophthalic acid and 2,6-naphthalenedicarboxylic acid, in particular terephthalic acid and isophthalic acid.

Preferred diols are ethylene glycol, butylene glycol and neopentyl glycol.

In general, the polyester comprises the following dicarboxylates and alkylenes, based in each case on the total amount of dicarboxylate or total amount of alkylene:

from 12 to 89 mol %, preferably from 25 to 79 mol % and more preferably from 30 to 72 mol %, of terephthalate;

from 0 to 25 mol %, preferably from 5 to 20 mol % and more preferably from 10 to 20 mol %, of isophthalate;

from 11 to 88 mol %, preferably from 16 to 70 mol % and more preferably from 17 to 58 mol %, of azelate;

from 0 to 50 mol %, preferably from 0 to 40 mol % and more preferably from 0.2 to 30 mol %, of sebacate;

from 0 to 50 mol %, preferably from 0 to 40 mol % and more preferably from 0 to 30 mol %, of adipate;

more than 30 mol %, preferably more than 40 mol % and more preferably more than 50 mol %, of ethylene or butylene.

Up to 10% by weight of the material of the outer layer (A) includes further additives, auxiliaries and/or other additives which are customarily used in polyester film technology.

In a favorable embodiment, the material of the outer layer (A) additionally contains from 2 to 19% by weight, preferably from 5 to 17% by weight and more preferably from 7 to 16% by weight, of a polymer which is incompatible with polyester (anti-PET polymer).

It has been found to be appropriate to produce the main polyester of the outer layer (A) from two separate polyesters I and II which are fed to the extruder for this layer as a mixture.

The heatsealable and peelable outer layer (A) is distinguished by characteristic features. It has a sealing commencement temperature (=minimum sealing temperature) with respect to APET/CPET and with respect to CPET trays of not more than 165° C., preferably not more than 160° C. and more preferably not more than 155° C., and a peeling force with respect to APET/CPET and CPET trays of at least 1 N, preferably at least 2.0 N, more preferably at least 2.3 N (always based on 15 mm film width). The heatsealable and peelable outer layer (A), with respect to APET/CPET and CPET trays, has a max. sealing temperature of generally 220° C., preferably 200° C. and more preferably 190° C., and a film which is peelable with respect to APET/CPET and CPET trays is obtained within the entire sealing range. In other words, this film in the 180° tensile experiment according to FIG. 2 provides a curve according to FIG. 3b. The term trays can be equated with materials in general.

For the preferred, abovementioned ranges, the peeling results can also be described numerically. According to the present experimental investigations, the peeling results can be correlated to one another simply by the following relationship between the sealing temperature (T=in ° C.) and the peeling force (in N/15 mm):

$$0.02 \cdot /° C. - 0.8 \leq \text{peeling force } F/N \text{ per } 15 \text{ mm} \leq 0.033 \cdot /° C. + 1.4$$

This relationship is depicted graphically in FIG. 5 for illustration.

The film of the present invention has a base layer (B) and at least one inventive outer layer (A). In this case, the film has a two-layer structure. In a preferred embodiment, the film has a three- or more than three-layer structure. In the case of the particularly preferred three-layer embodiment, it includes the base layer (B), the inventive outer layer (A) and an outer layer (C) on the opposite side to the outer layer (A); A-B-C film structure. In a four-layer embodiment, the film comprises an intermediate layer (D) between the base layer (B) and the outer layer (A) or (C).

The base layer of the film preferably includes at least 80% by weight of thermoplastic polyester (based on the weight of the base layer (B)). Suitable for this purpose are, for example, polyesters of ethylene glycol and terephthalic acid (=polyethylene terephthalate, PET), of ethylene glycol and naphthalene- 2,6-dicarboxylic acid (=polyethylene 2,6-naphthalate, PEN), of 1,4-bishydroxymethylcyclohexane and terephthalic acid (=poly-1,4-cyclohexanedimethylene terephthalate, PCDT) and also of ethylene glycol, naphthalene-2,6-dicarboxylic acid and biphenyl-4,40-dicarboxylic acid (=polyethylene 2,6-naphthalate bibenzoate, PENBB). Preference is given to polyesters which contain ethylene units and include, based on the dicarboxylate units, at least 90 mol %, more preferably at least 95. mol %, of terephthalate or 2,6-naphthalate units. The remaining monomer units stem from other dicarboxylic acids or diols. Advantageously, copolymers or mixtures or blends of the homo- and/or copolymers mentioned can also be used for the base layer (B). In the specification of the amounts of the dicarboxylic acids, the total amount of all dicarboxylic acids is 100 mol %. Similarly, the total amount of all diols also adds up to 100 mol %.

Suitable other aromatic dicarboxylic acids are preferably benzenedicarboxylic acids, naphthalenedicarboxylic acids (for example naphthalene-1,4- or 1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Of the cycloaliphatic dicarboxylic acids, mention should be made of cyclohexanedicarboxylic acids (in particular cyclohexane-1,4-dicarboxylic acid). Of the aliphatic dicarboxylic acids, the ($C_3$-$C_{19}$)alkanedioic acids are particularly suitable, and the alkane moiety may be straight-chain or branched.

Suitable other aliphatic diols are, for example, diethylene glycol, triethylene glycol, aliphatic glycols of the general formula HO—$(CH_2)_n$—OH where n is an integer from 3 to 6 (in particular propane-1,3-diol, butane-1,4-diol, pentane-1,5-diol and hexane-1,6-diol) or branched aliphatic glycols having up to 6 carbon atoms, cycloaliphatic, optionally heteroatom-containing diols having one or more rings. Of the cycloaliphatic diols, mention should be made of cyclohexanediols (in particular cyclohexane-1,4-diol). Suitable other aromatic diols correspond, for example, to the formula HO—$C_6H_4$—X—$C_6H_4$—OH where X is —$CH_2$—, —$C(CH_3)_2$—, —$C(CF_3)_2$—, —O—, —S— or —$SO_2$—. In addition, bisphenols of the formula HO—$C_6H_4$—$C_6H_4$—OH are also very suitable.

It is particularly advantageous when a polyester copolymer based on terephthalate and small amounts (preferably <5 mol %) of isophthalic acid or based on terephthalate and small amounts (preferably <5 mol %) of naphthalene-2,6-dicarboxylic acid is used in the base layer (B). In this case, the producibility of the film is particularly good. The base layer (B) then comprises substantially a polyester copolymer which is composed predominantly of terephthalic acid and isophthalic acid units and/or terephthalic acid and naphthalene-2,6-dicarboxylic acid units and of ethylene glycol units. The particularly preferred copolyesters which provide the desired properties of the film are those which are composed of terephthalate and isophthalate units and of ethylene glycol units.

The polyesters can be prepared by the transesterification process. In this process, the starting materials are dicarboxylic esters and diols which are reacted with the customary transesterification catalysts such as salts of zinc, calcium, lithium and manganese. The intermediates are then polycondensed in the presence of generally customary polycondensation catalysts such as antimony trioxide, titanium oxides or esters, or else germanium compounds. The preparation may equally be by the direct esterification process in the presence of polycondensation catalysts. This process starts directly from the dicarboxylic acids and the diols.

To achieve the desired whiteness and the desired low transparency (light transmission), the base layer (B) comprises an inorganic white pigment or a polymer which is substantially incompatible with polyester or a combination of the two. Useful inorganic white pigments are, for example, titanium dioxide, calcium carbonate, barium sulfate, zinc sulfide or zinc oxide. In order to attain the desired whiteness (>60) and the desired low transparency (<60%), the base layer (B) should have a high filler content.

In a preferred embodiment, the sole coloring pigment used is titanium dioxide ($TiO_2$). Preference is given to adding it to the original raw material as an extrusion masterbatch (the titanium dioxide concentration is distinctly higher here than in the biaxially oriented film). Typical values for the $TiO_2$ concentration in the extrusion masterbatch are 50% by weight of titanium dioxide. The titanium dioxide may be either of the rutile type or of the anatase type. Preference is given to using titanium dioxide of the rutile type. The particle size of the titanium dioxide is generally between 0.05 and 0.5 μm, preferably between 0.1 and 0.3 μm. The incorporated $TiO_2$ pigments in the base layer (B) impart to the film a brilliant white appearance. The $TiO_2$ concentration to achieve the desired whiteness (>60) and the desired low transparency (<60%) is generally above 3% by weight but below 20% by weight, preferably above 4% by weight but below 18% by weight and most preferably above 5% by weight but below 16% by weight, based on the total weight of the base layer (B).

In a further preferred embodiment, the base layer (B) comprises at least barium sulfate as a pigment. The barium sulfate concentration to achieve the desired whiteness (>60) and the desired low transparency (<60%) is generally from 0.2 to 40% by weight, preferably from 0.5 to 30% by weight, more preferably from 1 to 25% by weight, based on the weight of the crystallizable thermoplastics in the base layer (B). The average particle size of the barium sulfate is relatively small and is preferably in the range from 0.1 to 5 μm, more preferably in the range from 0.2 to 3 μm (Sedigraph method). The density of the barium sulfate used is preferably between 4 and 5 g/cm$^3$. Preference is given to metering the barium sulfate to the thermoplastic as an extrusion masterbatch in the film production. In a preferred embodiment, precipitated barium sulfate types are used. Precipitated barium sulfate is obtained from barium salts and sulfates or sulfuric acid as a finely divided colorless powder whose particle size can be controlled by the precipitation conditions. Precipitated barium sulfates can be prepared by the customary processes which are described in Kunststoff Journal 8, No. 10, 30-36 and No. 11, 31-36 (1974). In a particularly preferred embodiment, the main constituent present in the base layer of the inventive film is a crystallizable polyethylene terephthalate and from 1 to 25% by weight of precipitated barium sulfate, appropriately having a particle diameter of from 0.4 to 1 μm, and particular preference is given to BLANC FIXE® XR-HX or BLANC FIXE® HXH from Sachtleben Chemie, Germany.

For a further increase in the whiteness, it is possible to add suitable optical brighteners to the base layer (B), in which case the optical brightener is used in amounts in the range from 10 to 50 000 ppm, in particular from 20 to 30 000 ppm, more preferably from 50 to 25 000 ppm, based on the weight of the crystallizable thermoplastic in (B). Preference is given to also metering the optical brightener to the thermoplastic as an extrusion masterbatch in the film production. The inventive optical brighteners are capable of absorbing UV rays in the range from 360 to 380 nm and emitting them again as longer-wavelength, visible blue-violet light. Suitable optical brighteners are, for example, bisbenzoxazoles, phenylcoumarins and bisstearylbiphenyls, in particular phenylcoumarin; particular preference is given to triazinephenylcoumarin which is obtainable under the product name TINOPAL® from Ciba-Geigy, Basel, Switzerland, or HOSTALUX® KS (Clariant, Germany) and also EASTOBRITEX® OB-1 (Eastman).

Where appropriate, it is also possible to add to the base layer (B), in addition to the optical brightener, polyester-soluble blue dyes. Suitable blue dyes have been found to be, for example, cobalt blue, ultramarine blue and anthraquinone dyes, in particular SUDAN BLUE® 2 (BASF, Ludwigshafen, Federal Republic of Germany). The blue dyes are used in amounts of from 10 to 10 000 ppm, in particular from 20 to 5000 ppm, more preferably from 50 to 1000 ppm, based on the weight of the crystallizable thermoplastic.

According to the invention, titanium dioxide or the barium sulfate, the optical brightener and, where appropriate, the blue dye may already have been metered in by the manufacturer of the thermoplastic raw material or may be metered in the course of film production via masterbatch technology into the extruder, for example, for the base layer (B). Particular preference is given to adding the titanium dioxide or the barium sulfate, the optical brightener and, where appropriate, the blue dye via masterbatch technonology. The additives are preferably dispersed fully in a solid carrier material. Useful carrier materials include the thermoplastic itself, for example the polyethylene terephthalate or else other polymers which are sufficiently compatible with the thermoplastic. It is advantageous when the particle size and the bulk density of the extrusion masterbatch(es) are similar to the particle size and the bulk density of the thermoplastic, so that a homogeneous distribution and therefore a homogeneous whiteness and thus a homogeneous transparency are achieved.

In a preferred embodiment, the base layer (B), to achieve the desired whiteness and the desired low transparency, comprises a polyester-incompatible polymer (anti-PET polymer). Suitable polyester-incompatible polymers, after the stretching operation, generate vacuoles which lead to whitening of the stretched film via refraction of light. To achieve the desired whiteness (>60) and the desired low transparency (<60%), the base layer (B) in the preferred embodiment comprises a polyester-incompatible polymer in a minimum amount of 2% by weight based on the weight of the base layer (B).

Examples of suitable incompatible polymers (anti-PET polymers) are polymers based on ethylene (e.g. LLDPE, HDPE), propylene (PP), cycloolefins (CO), amides (PA) or styrene (PS). In a preferred embodiment, the polyester-incompatible polymer (anti-PET polymer) used is a copolymer. Examples thereof are copolymers based on ethylene (C2/C3, C2/C3/C4 copolymers), propylene (C2/C3, C2/C3/C4 copolymers), butylene (C2/C3, C2/C3/C4 copolymers) or based on cycloolefins (norbornene/ethylene, tetracyclododecene/ethylene copolymers). In one of the particularly preferred embodiments, the polyester-incompatible polymer (anti-PET polymer) is a cycloolefin copolymer (COC). Such cycloolefin copolymers are described, for example, in EP-A-1 068 949 or in JP 05-009319, which are incorporated herein by reference.

Among the cycloolefin copolymers, preference is given in particular to those which comprise polymerized units of polycyclic olefins having a norbornene basic structure, more preferably norbornene or tetracyclododecene. Particular preference is given to cycloolefin copolymers (COC) which contain polymerized units of acyclic olefins, in particular ethylene. Very particular preference is given to norbornene/ethylene and tetracyclodode-cene/ethylene copolymers which contain from 5 to 80% by weight of ethylene units, preferably from 10 to 60% by weight of ethylene units (based on the mass of the copolymer).

The cycloolefin polymers generally have glass transition temperatures between −20 and 400° C. To achieve a white base layer (B) having low transparency, particularly suitable cycloolefin copolymers (COC) are those which have a glass transition temperature $T_g$ of greater than 70° C., preferably greater than 90° C. and in particular greater than 110° C. The viscosity number (decalin, 135° C., DIN 53 728) is appropriately between 0.1 and 200 ml/g, preferably between 50 and 150 ml/g.

The cycloolefin copolymers (COC) are prepared, for example, by heterogeneous or homogeneous catalysis with organometallic compounds which is described in a multitude of documents. Suitable catalyst systems based on mixed catalysts of titanium or vanadium compounds in combination with aluminum organyls are described in DD 109 224, DD 237 070 and EP-A-0 156 464.

EP-A-0 283 164, EP-A-0 407 870, EP-A-0 485 893 and EP-A-0 503 422 describe the preparation of cycloolefin copolymers (COC) with catalysts based on soluble metallocene complexes. Particular preference is given to using cycloolefin copolymers prepared with catalysts which are based on soluble metallocene complexes. Such COCs are commercially obtainable; for example TOPAS® (Ticona, Frankfurt).

To achieve the desired whiteness (>60) and the desired low transparency (<60%), the base layer (B) in the preferred embodiment comprises a cycloolefin copolymer (COC) in a minimum amount of 2% by weight, preferably in an amount of from 4 to 50% by weight and more preferably from 6 to 40% by weight, based on the weight of the base layer (B). For the preferred embodiment of the present invention, it is essential that the cycloolefin copolymer (COC) is not compatible with the polyester and does not form a homogeneous mixture with it. The COC is incorporated into the base layer either as a pure granule or as a granulated concentrate (masterbatch) by premixing the polyester granule or powder with the COC or the COC masterbatch and subsequently feeding it to the extruder. In the extruder, the components are mixed further and heated to processing temperature. It is appropriate that the extrusion temperature is above the glass transition temperature $T_g$ of the COC, generally at least 5 K, preferably from 10 to 180 K, in particular from 15 to 150 K, above the glass transition temperature $T_g$ of the cycloolefin copolymer (COC).

In another preferred embodiment, the base layer (B) of the film, to improve the whiteness and reduce the transparency, may contain a combination of at least one white pigment, a substantially polyester-incompatible polymer (anti-PET polymer) and optionally an optical brightener. Particular preference is given to optimizing whiteness and transparency of the base layer (B) by a combination of titanium dioxide or barium sulfate and a cycloolefin copolymer (COC), the cycloolefin copolymer (COC) having a glass transition temperature $T_g$ of greater than 70° C., preferably greater than 90° C. and in particular greater than 110° C.

The film of the present invention has an at least two-layer structure. In that case, it includes the base layer (B) and the inventive sealable and peelable outer layer (A) applied to it by coextrusion.

The sealable and peelable outer layer (A) applied to the base layer (B) by coextrusion is composed predominantly, i.e. preferably to an extent of at least 80% by weight, of polyesters.

According to the invention, the heatsealable and peelable outer layer (A) comprises polyesters based on aromatic and aliphatic acids and preferably aliphatic diols. In addition, the outer layer (A) comprises inorganic and/or organic particles in a concentration of preferably from 1 to 10% by weight.

In the preferred embodiment, polyesters are copolyesters or blends of homo- and copolyesters or blends of different copolyesters which are formed on the basis of aromatic and aliphatic dicarboxylic acids and aliphatic diols.

Examples of the aromatic dicarboxylic acids which can be used in accordance with the invention are terephthalic acid, isophthalic acid, phthalic acid and naphthalene-2,6-dicarboxylic acid.

Examples of the aliphatic dicarboxylic acids which can be used in accordance with the invention are succinic acid, glutaric acid, adipic acid, pimelic acid, suberic acid, azelaic acid and sebacic acid.

Examples of the aliphatic diols which can be used in accordance with the invention are ethylene glycol, 1,3-propanediol, 1,3-butanediol, 1,4-butanediol, 1,5-pentanediol, 2,2-dimethyl-1,3-propanediol, diethylene glycol, triethylene glycol and 1,4-cyclohexanedimethanol.

The polyester for the outer layer (A) is preferably prepared from two polyesters I and II.

The proportion of the polyester I which includes one or more aromatic dicarboxylates and one or more aliphatic alkylenes in the outer layer (A) is preferably from 0 to 50% by weight. In the preferred embodiment, the proportion of the polyester I is from 5 to 45% by weight, and in the particularly preferred embodiment, it is from 10 to 40% by weight.

In general, the polyester I of the inventive outer layer (A) is based on the following dicarboxylates and alkylenes, based in each case on the total amount of dicarboxylate or total amount of alkylene:

from 70 to 100 mol %, preferably from 72 to 95 mol % and more preferably from 74 to 93 mol %, of terephthalate;

from 0 to 30 mol %, preferably from 5 to 28 mol % and more preferably from 7 to 26 mol %, of isophthalate;

more than 50 mol %, preferably more than 65 mol % and more preferably more than 80 mol %, of ethylene units.

Any remaining fractions present stem from other aromatic dicarboxylic acids and other aliphatic diols, as have already been listed above for the base layer (B).

Very particular preference is given to those copolyesters in which the proportion of terephthalate units is from 74 to 88 mol %, the corresponding proportion of isophthalate units is from 12 to 26 mol % (the dicarboxylate fractions adding up to 100 mol %) and the proportion of ethylene units is 100 mol %. In other words, they are polyethylene terephthalate/isophthalate.

In a further preferred embodiment, the polyester I includes a mixture which comprises a copolyester composed of terephthalate, isophthalate and of ethylene units, and an aromatic polyester homopolymer, e.g. a polybutylene terephthalate.

According to the present invention, the proportion of polyester II in the outer layer (A) is from 50 to 100% by weight. In the preferred embodiment the proportion of polyester II is from 55 to 95% by weight and in the particularly preferred embodiment it is from 60 to 90% by weight.

The polyester II preferably includes a copolymer of aliphatic and aromatic acid components, in which the aliphatic acid components are preferably from 20 to 90 mol %, in particular from 30 to 70 mol % and more preferably from 35 to 60 mol %, based on the total acid amount of the polyester II. The remaining dicarboxylate content up to 100 mol % stems from aromatic acids, preferably terephthalic acid and/or isophthalic acid, and also, among the glycols, from aliphatic or cycloaliphatic or aromatic diols, as have already been described in detail above with regard to the base layer.

In general, the polyester II of the inventive outer layer (A) is preferably based at least on the following dicarboxylates and alkylenes, based in each case on the total amount of dicarboxylate or the total amount of alkylene:

from 20 to 90 mol %, preferably from 30 to 65 mol % and more preferably from 35 to 60 mol %, of azelate;

from 0 to 50 mol %, preferably from 0 to 45 mol % and more preferably from 0 to 40 mol %, of sebacate;

from 0 to 50 mol %, preferably from 0 to 45 mol % and more preferably from 0 to 40 mol %, of adipate;

from 10 to 80 mol %, preferably from 20 to 70 mol % and more preferably from 30 to 60 mol %, of terephthalate;

from 0 to 30 mol %, preferably from 3 to 25 mol % and more preferably from 5 to 20 mol %, of isophthalate;

more than 30 mol %, preferably more than 40 mol % and more preferably more than 50 mol %, of ethylene or butylene.

Any remaining fractions present stem from other aromatic dicarboxylic acids and other aliphatic diols, as have already been listed above for the base layer (B), or else from hydroxycarboxylic acids such as hydroxybenzoic acid or the like.

The presence of preferably at least 10 mol % of aromatic dicarboxylic acid ensures that the polymer II can be processed without adhesion, for example in the coextruder or in the longitudinal stretching.

The outer layer (A) preferably comprises a mixture of the polyesters I and II. Compared to the use of only one polyester with comparable components and comparable proportions of the components, a mixture has the following advantages:

The mixture of the two polyesters I and II, from the aspect of the particular glass transition temperatures ($T_g$s) is easier to process (to extrude). As investigations have shown, the mixture of a polymer having a high $T_g$ (polyester I) and a polymer having a low $T_g$ (polyester II) has a lesser tendency to adhere in the intake of the coextruder than a single polymer having a correspondingly mixed $T_g$.

The polymer production is simpler, because the number of metering stations available for the starting materials is generally not unlimited.

Moreover, from a practical aspect, the desired peeling properties can be adjusted more individually with the mixture than when a single polyester is used.

The addition of particles (see below) is also simpler in the case of polyester I than in the case of polyester II.

Appropriately, the glass transition temperature of polyester I is more than 50° C. The glass transition temperature of polyester I is preferably more than 55° C. and more preferably more than 60° C. When the glass transition temperature of polyester I is less than 50° C., the film in some circumstances cannot be produced in a reliable process. The tendency of the outer layer (A) to adhere, for example to rolls, may be so high that frequent film breaks, in particular in the longitudinal stretching, have to be expected. When this happens, the film can wind around the rolls in the longitudinal stretching, which can lead to considerable damage to the machine. In the extrusion, such a polyester adheres readily to the metallic walls and thus leads to blockages.

Appropriately, the glass transition temperature of polyester II is less than 20° C. The glass transition temperature is preferably less than 15° C. and more preferably less than 10° C. When the glass transition temperature of polyester II is greater than 20° C., the film has an increased tendency to start to tear or tear off when pulled off the tray, which is undesired.

In a preferred embodiment, the heatsealable and peelable outer layer (A) additionally comprises a polymer which is incompatible with polyester (anti-PET polymer). According to the present invention, the proportion of the polyester-incompatible polymer (anti-PET polymer) is preferably from 2 to 19% by weight, based on the mass of the outer layer (A). In a preferred embodiment, the proportion of the polymer is from 5 to 17% by weight and in the particularly preferred embodiment it is from 7 to 16% by weight, likewise based on the mass of the outer layer (A).

Examples of suitable incompatible polymers have already been described for the base layer (B). In one of the particularly preferred embodiments, the polymer incompatible with polyester is a cycloolefin copolymer (COC). As already described for the base layer (B), very particular preference is given here also to norbornene/ethylene and tetracyclododecene/ethylene copolymers which contain from 5 to 80% by weight of ethylene units, preferably from 10 to 60% by weight of ethylene units (based on the mass of the copolymer).

The cycloolefin polymers generally have glass transition temperatures between −20 and 400° C. To improve the peeling properties of the outer layer (A), particularly suitable cycloolefin copolymers (COCs) are those which have a glass transition temperature of less than 160° C., preferably less than 120° C. and more preferably less than 80° C. Cycloolefin copolymers having a glass transition temperature of less than 80° C. generate essentially no vacuoles, and are therefore particularly preferred for the peelable outer layer (A) over those having a glass transition temperature of greater than 80° C. The glass transition temperature should preferably be above 50° C., with preference above 55° C., in particular above 60° C. The viscosity number (decalin, 135° C., DIN 53 728) is appropriately between 0.1 and 200 ml/g, preferably between 50 and 150 ml/g.

For the peelable outer layer (A) too, particular preference is given to using cycloolefin copolymers prepared with catalysts which are based on soluble metallocene complexes. Such COCs are commercially obtainable; for example TOPAS® (Ticona, Frankfurt).

According to the invention, the heatsealable and peelable outer layer (A) comprises inorganic and/or organic particles. According to the present invention, the proportion of particles is preferably from 1 to 10% by weight, based on the mass of the outer layer (A). In a preferred embodiment, the proportion of particles is from 1.5 to 9% by weight and in the particularly preferred embodiment it is from 2.0 to 8% by weight, likewise based on the mass of the outer layer (A).

In contrast, when the outer layer (A) of the film contains particles in a concentration of less than 1% by weight, there is generally no positive influence on the removal performance of the film from the tray; the film tends to start to tear or to tear off. In contrast, when the outer layer (A) of the film contains particles in a concentration of more than 10% by weight, the sealing of the film is too greatly weakened.

It has been found to be advantageous when the particles are present in a certain size, in a certain concentration and in a certain distribution. In addition, it is also possible to add mixtures of two and more different particle systems or mixtures of particle systems in the same chemical composition, but different particle size, to the outer layer (A).

Customary particles (also referred to as pigments or antiblocking agents) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, alumina, lithium fluoride, calcium, barium, zinc or manganese salts of the dicarboxylic acids used, carbon black, titanium dioxide, kaolin or crosslinked polystyrene or acrylate particles. The particles may be added to the layer in the particular advantageous concentrations, for example as a glycolic dispersion during the polycondensation or via master-batches in the course of the extrusion.

Particles which are preferred in accordance with the invention are synthetic, amorphous $SiO_2$ particles in colloidal form. These particles are bound into the polymer matrix in an outstanding manner. To (synthetically) produce the $SiO_2$ particles (also known as silica gel), sulfuric acid and sodium silicate are initially mixed with one another under controlled conditions to form hydrosol. This eventually forms a hard, transparent mass which is known as a hydrogel. After separation of the sodium sulfate formed as a by-product by a washing process, the hydrogel can be dried and further processed. Control of the washing water pH and the drying conditions can be used to vary the important physical parameters, for example pore volume, pore size and the size of the surface of the resulting silica gel. The desired particle size (for example the $d_{50}$ value) and the desired particle size distribution (for example the SPAN98) are obtained by suitable grinding of the silica gel (for example mechanically or hydromechanically). Such particles can be obtained, for example, via Grace, Fuji, Degussa or Ineos.

The particles preferably have an average particle diameter $d_{50}$ of from 2.5 to 12.0 μm, in particular from 3.0 to 10.0 μm and more preferably from 3.5 to 8.0 μm. When particles having a diameter which is below 2.5 μm are used, there is under some circumstances no positive influence of the particles on the removal performance of the film from the tray. In this case, the film again tends to start to tear or continue to tear on removal from the tray, which is undesired. Particles having a diameter greater than 12 μm generally cause filter problems.

In the heatsealable and peelable outer layer (A), the ratio of particle size $d_{50}$ to layer thickness $d_A$ of the outer layer (A) is preferably $\geq 1$. In particular, the diameter/layer thickness ratio is at least 1.1 and more preferably at least 1.2. In these cases, there is a particularly positive influence of the particles on the removal performance of the film from the tray.

It has been found to be particularly advantageous to use particles in the heatsealable and peelable outer layer (A) whose particle diameter distribution has a degree of scatter which is described by a SPAN98 of $\leq 2.0$ (definition of SPAN98, see test method). Preference is given to a SPAN98 of $\leq 1.9$ and particular preference to a SPAN98 of $\leq 1.8$. In contrast, when the outer layer (A) of the film comprises particles whose SPAN98 is greater than 2.0, the optical properties and the sealing properties of the film deteriorate.

Moreover, it has been found to be advantageous to adjust the roughness of the heatsealable and peelable outer layer (A) in such a way that its $R_a$ value is preferably greater than 60 nm. The roughness $R_a$ is preferably greater than 80 nm and it is more preferably greater than 100 nm; the upper limit of the roughness should not exceed 400 nm, preferably 350 nm, in particular 300 nm. This can be controlled via the selection of the particle diameters, their concentration and the variation of the layer thickness.

In a particularly advantageous three-layer embodiment (ABC), the film includes the white base layer (B), the inventive outer layer (A) and a outer layer (C) on the opposite side to the outer layer (A). This outer layer (C) may include the polymers described for the base layer, but preferably does not contain any white pigments or a polymer incompatible with polyester. To improve the winding capability, the outer layer (C) comprises the customary particles (also known as "antiblocking agents"), as already described for outer layer (A). The particles of the outer layer (C) should have an average particle diameter $d_{50}$ (=median) of from 1.5 to 6 µm. It has been found to be particularly appropriate to use particles having an average particle diameter $d_{50}$ of from 2 to 5 µm and more preferably from 2.5 to 4 µm. The particles of the outer layer (C) should preferably have a degree of scatter which is described by a SPAN98 of $\leq 2.0$. Preference is given to the SPAN98 being $\leq 1.9$ and particular preference to the SPAN98 being $\leq 1.8$. The particles of the outer layer (C) should generally be present in a concentration of from 0.1 to 0.5% by weight. The concentration of the particles is preferably from 0.12 to 0.4% by weight and more preferably from 0.15 to 0.3% by weight.

The outer layer (C) increases the gloss of the film and prevents the attrition of the highly filled white base layer (B). The gloss of the film surface (C) in a three-layer film is preferably greater than 100 (measured to DIN 67530 with reference to ASTM-D 523-78 and ISO 2813 with angle of incidence 20°). In a preferred embodiment, the gloss of this side is more than 110 and in a particularly preferred embodiment more than 120. This film surface is therefore especially suitable for a further functional coating, for printing or for metallization.

Between the base layer and the outer layers may optionally be disposed another intermediate layer. This may in turn include the polymers described for the base layer. In a particularly preferred embodiment, the intermediate layer includes the polyesters used for the base layer. The intermediate layer may also comprise the customary additives described below. The thickness of the intermediate layer is generally greater than 0.3 µm and is preferably in the range from 0.5 to 15 µm, in particular in the range from 1.0 to 10 µm, more preferably in the range from 1.0 to 5 µm.

In the case of the two-layer and the particularly advantageous three-layer embodiment of the inventive film, the thickness of the outer layer (A) is preferably in the range from 0.7 to 10.0 µm, in particular in the range from 0.8 to 8.0 µm and more preferably in the range from 0.8 to 6.0 µm. When the thickness of the outer layer (A) is more than 10.0 µm, the peeling force rises markedly and is no longer within the preferred range. Furthermore, the peeling performance of the film is impaired. In contrast, when the thickness of the outer layer (A) is less than 0.7 µm, the film generally no longer has the desired peeling properties.

The thickness of the other, nonsealable outer layer (C) may be the same as the outer layer (A) or different; its thickness is generally between 0.5 and 5 µm.

The total thickness of the inventive polyester film may vary within wide limits. It is preferably from 3 to 200 µm, in particular from 4 to 150 µm, preferably from 5 to 100 µm, and the base layer (B) has a proportion of preferably from 45 to 97% of the total thickness.

The base layer and the other layers may additionally comprise customary additives, for example stabilizers (UV, hydrolysis), flame-retardant substances or fillers. They are appropriately added to the polymer or to the polymer mixture before the melting.

The present invention also provides a process for producing the film. To produce the inventive heatsealable and peelable outer layer (A), the particular polymers (polyester I, polyester II, optionally further polymers, for example polyester-incompatible polymer (anti-PET polymer), for example masterbatch(es) for particles) are appropriately fed directly to the extruder for the outer layer (A). The materials can be extruded at from about 200 to 280° C. From a process engineering point of view (mixing of the different components), it has been found to be particularly favorable when the extrusion of the polymers for the outer layer (A) is carried out using a twin-screw extruder having degassing means.

The polymers for the base layer (B) and for the further outer layer (C) which is possibly present and, where appropriate, the intermediate layer are appropriately fed to the (coextrusion) system via further extruders. The white pigments for the white base layer (B) may be fed to the extruder for the base layer (B) by means of masterbatch technology via the drying process customary for the polyester. The polyester-incompatible polymer (anti-PET polymer) for the white base layer (B) is preferably added by metering to the dried polyester chips by means of a side feeder directly upstream of the extruder intake zone. The use of a side feeder prevents a polyester-incompatible polymer having a low softening or melting point from adhering together under the drying conditions customary for polyester.

The melts are shaped to flat melt films in a multilayer die and layered one on top of the other. Subsequently, the multilayer film is drawn off with the aid of a chill roll and optionally further rolls and solidified.

The biaxial stretching of the film is generally carried out sequentially. Simultaneous stretching of the film is also possible, but is not necessary. In the sequential stretching, preference is given to stretching first in longitudinal direction (i.e. in machine direction) and then in transverse direction (i.e. at right angles to machine direction). The stretching in longitudinal direction can be carried out with the aid of two rolls rotating at different rates in accordance with the desired stretching ratio. For transverse stretching, an appropriate tenter frame is generally used.

The temperature at which the stretching is carried out can be varied within a relatively wide range and depends on the desired properties of the film. In general, the stretching is carried out in the longitudinal direction (machine direction orientation=MDO) in a temperature range of from approx. 60 to 130° C. (heating temperatures from 60 to 130° C.), and in transverse direction (transverse direction orientation=TDO) in a temperature range from approx. 90° C. (commencement of stretching) to 140° C. (end of stretching). The longitudinal stretching ratio is preferably in the range from 2:1 to 5.5:1, preferably from 2.3:1 to 5.0:1. The transverse stretching ratio is preferably in the range from 2.4:1 to 5.0:1, in particular from 2.6:1 to 4.5:1.

The preferred temperature range at which the biaxial stretching is carried out is from 60 to 120° C. in the longitudinal stretching (MDO). The heating temperatures of the film in the longitudinal stretching are in the range from 60 to 115° C. In the transverse stretching (TDO), the temperatures of the film are in the range from 90° C. (commencement of stretching) to 140° C. (end of stretching). The longitudinal stretching ratio in this preferred temperature range is in the range from 2.0:1 to 5.0:1, preferably from 2.3:1 to 4.8:1. The transverse stretching ratio is generally in the range from 2.4:1 to 5.0:1, preferably from 2.6:1 to 4.5:1.

The particularly preferred temperature range in which the biaxial stretching is carried out in the case of the longitudinal stretching (MDO) is from 60 to 110° C. The heating temperatures of the film in the longitudinal stretching are in the range from 60 to 105° C. In the transverse stretching (TDO), the temperatures of the film are in the range from 90° C. (beginning of the stretching) to 140° C. (end of the stretching). The longitudinal stretching ratio in this preferred temperature range is in the range from 2.0:1 to 4.8:1, preferably from 2.3:1 to 4.6:1. The transverse stretching ratio is generally in the range from 2.4:1 to 5.0:1, preferably from 2.6:1 to 4.5:1.

The preferred and especially the particularly preferred temperatures in the MDO particularly effectively take account of the adherent behavior of outer layer (A) to rolls (metallic, ceramic or particularly coated roll surfaces).

Before the transverse stretching, one or both surfaces of the film can be coated inline by the processes known per se. The inline coating may lead, for example, to improved adhesion between a metal layer or a printing ink and the film, to an improvement in the antistatic performance, in the processing performance or else to further improvement of barrier properties of the film. The latter is obtained, for example, by applying barrier coatings such as EVOH, PVOH or the like. In that case, preference is given to applying such layers to the nonsealable surface, for example the surface (C) of the film.

In the subsequent heat-setting, the film is kept at a temperature of from approx. 150 to 250° C. over a period of from about 0.1 to 10 s. Subsequently, the film is wound up in a customary manner.

A further advantage of the invention is that the production costs of the inventive film are not substantially above those of a film made of standard polyester. In addition, it is guaranteed that, in the course of the production of the film, offcut material which arises intrinsically in the operation of the film production can be reused for the film production as regrind in an amount of up to 60% by weight, preferably from 5 to 50% by weight, based in each case on the total weight of the film, without the physical properties of the film being significantly adversely affected.

The film according to the invention is outstandingly suitable for packaging foods and other consumable goods, in particular in the packaging of foods and other consumable goods in trays in which peelable polyester films are used for opening the packaging.

The table which follows (table 1) once again summarizes the most important preferred film properties.

To characterize the raw materials and the films, the following test methods were used for the purposes of the present invention:

Measurement of the Average Diameter $d_{50}$

The determination of the average diameter $d_{50}$ was carried out by means of laser on a Malvern Master Sizer (from Malvern Instruments Ltd., UK) by means of laser scanning (other measuring instruments are, for example, Horiba LA 500 or Sympathec Helos, which use the same measuring principle). To this end, the samples were introduced together with water into a cuvette and this was then placed in the measuring instrument. The dispersion is scanned by means of a laser and the signal is used to determine the particle size distribution by comparison with a calibration curve. The particle size distribution is characterized by two parameters, the median value $d_{50}$ (=measure of the position of the average value) and the degree of scatter, known as the SPAN98 (=measure of the scatter of the particle diameter). The measuring procedure is automatic and also includes the mathematical determination of the $d_{50}$ value. The $d_{50}$ value is determined by definition from the (relative) cumulative curve of the particle size distribution: the point at which the 50% ordinate value cuts the cumulative curve provides the desired $d_{50}$ value (also known as median) on the abscissa axis.

Measurement of SPAN98

The determination of the degree of scatter, the SPAN98, was carried out with the same measuring instrument as described above for the determination of the average diameter $d_{50}$. The SPAN98 is defined as follows:

$$SPAN98 = \frac{d_{98} - d_{10}}{d_{50}}$$

The basis of the determination of $d_{98}$ and $d_{10}$ is again the (relative) cumulative curve of the particle size distribution

TABLE 1

|  | Inventive range | Preferred | More preferred | Unit | Test method |
|---|---|---|---|---|---|
| Outer layer (A) | | | | | |
| Proportion of units in the inventive polyester, formed from aromatic dicarboxylic acids | 12 to 89 | 30 to 84 | 40 to 82 | mol % | |
| Proportion of units in the inventive polyester, formed from aliphatic dicarboxylic acids | 11 to 88 | 16 to 70 | 18 to 60 | mol % | Test method |
| Polyester I | 0 to 50 | 5 to 45 | 10 to 40 | % by wt. | |
| Polyester II | 50 to 100 | 55 to 95 | 60 to 90 | % by wt. | |
| Particle diameter $d_{50}$ | 2.5 to 12 | 3.0 to 10 | 3.5 to 8 | μm | |
| Filler concentration | 1.0 to 10.0 | 1.5 to 9.0 | 2.0 to 8.0 | % by wt. | |
| Thickness of the outer layer A | 0.7 to 10.0 | 0.8 to 8.0 | 0.8 to 6.0 | μm | |
| Particle diameter/layer thickness ratio | >/=1.0 | >/=1.1 | >/=1.2 | | |
| Thickness of the film | 3 to 200 | 4 to 150 | 5 to 100 | μm | |
| Properties | | | | | |
| Minimum sealing temperature of OL (A) with respect to APET/CPET or PET trays | 165 | 160 | 155 | ° C. | |
| Seal seam strength of OL (A) with respect to APET/CPET or PET trays | 1.0 to 8 | 2.0 to 8 | 2.3 to 8 | N/15 mm | |
| Gloss of the outer layers A and C | >70 and >100 | >75 and >110 | >80 and >120 | | DIN 67530 |
| Whiteness of the film | <20 | <16 | <12 | % | according to Berger |
| Transparency (light transmission) | <60 | <55 | <50 | % | ASTM D 1003 |

OL: Outer layer,
>/=: greater than/equal to (see above "Measurement of the average diameter $d_{50}$"). The point at which the 98% ordinate value cuts the cumulative curve provides the desired $d_{98}$ value directly on the abscissa axis and the point at which the 10% ordinate value cuts the cumulative curve provides the desired $d_{10}$ value on the abscissa axis.

SV Value

The SV value of the polymer was determined by the measurement of the relative viscosity ($\eta_{rel}$) of a 1% solution in dichloroacetic acid in an Ubbelohde viscometer at 25° C. The SV value is defined as follows:

$$SV=(\eta rel-1)\cdot 1000.$$

Glass Transition Temperatures $T_g$

The glass transition temperature $T_g$ was determined using film samples with the aid of DSC (differential scanning calorimetry). The instrument used was a Perkin-Elmer DSC 1090. The heating rate was 20 K/min and the sample weight approx. 12 mg. In order to eliminate the thermal history, the samples were initially preheated to 300° C., kept at this temperature for 5 minutes and then subsequently quenched with liquid nitrogen. The thermogram was used to find the temperature for the glass transition $T_g$ as the temperature at half of the step height.

Seal Seam Strength (Peel Strength)

To determine the seal seam strength, a film strip (100 mm long×15 mm wide) is placed on an appropriate strip of the tray and sealed at the set temperature of >140° C., a sealing time of 0.5 s and a sealing pressure of 4 bar (HSG/ET sealing unit from Brugger, Germany, sealing jaw heated on both sides). In accordance with FIG. 2, the sealed strips are clamped into the tensile testing machine (for example from Zwick, Germany) and the 180° seal seam strength, i.e. the force required to separate the test strips, was determined at a removal rate of 200 mm/min. The seal seam strength is quoted in N per 15 mm of film strip (e.g. 3 N/15 mm).

Determination of the Minimum Sealing Temperature

The Brugger HSG/ET sealing unit as described above for the measurement of the seal seam strength is used to produce heatsealed samples (seal seam 15 mm×100 mm), and the film is sealed at different temperatures with the aid of two heated sealing jaws at a sealing pressure of 4 bar and a sealing time of 0.5 s. The 180° seal seam strength was measured as for the determination of the seal seam strength. The minimum sealing temperature is the temperature at which a seal seam strength of at least 1.0 N/15 mm is attained.

Roughness

The roughness $R_a$ of the film was determined to DIN 4768 at a cutoff of 0.25 mm. It was not measured on a glass plate, but rather in a ring. In the ring method, the film is clamped into a ring, so that neither of the two surfaces touches a third surface (for example glass).

Whiteness

The whiteness is determined according to Berger, by generally placing more than 20 film plies one on top of another. The whiteness is determined with the aid of the ®ELREPHO electrical remission photometer from Zeiss, Oberkochem (Germany), standard illuminant C, 2° normal observer. The whiteness is defined as W=RY+3RZ−3RX. W=whiteness, RY, RZ, RX=appropriate reflection factors when a Y, Z and X color measurement filter is used. The white standard used is a barium sulfate presscake (DIN 5033, part 9). A comprehensive description is given, for example, in Hansl Loos, "Farbmessung" [Color measurement], Verlag Beruf und Schule, Itzehoe (1989).

Light Transmission/Transparency

The light transmission/transparency refers to the ratio of the total amount of light transmitted to the amount of incident light. The light transmission is measured to ASTM D 1003 with the "Hazegard plus" instrument (from Pausch-Messtechnik, Haan, Germany).

Gloss

The gloss of the film was determined to DIN 67530. The reflector value was measured as a characteristic optical parameter for the surface of a film. Based on the standards ASTM-D 523-78 and ISO 2813, the angle of incidence was set to 20°. A light beam hits the flat test surface at the angle of incidence set and is reflected or scattered by it. The light beams incident on the photoelectronic detector are displayed as a proportional electrical quantity. The measurement is dimensionless and has to be quoted together with the angle of incidence.

Tensile Strain at Break

The tensile strain at break of the film was measured to DIN 53455. The testing rate is 1%/min; 23° C.; 50% relative humidity.

Modulus of Elasticity

The modulus of elasticity of the film was measured to DIN 53457. The testing rate is 1%/min; 23° C.; 50% relative humidity.

Shrinkage

The shrinkage of the film was determined to DIN 40634. The testing conditions are 150° C., 15 min.

The invention is illustrated hereinbelow with reference to examples.

EXAMPLE 1

To produce a white peelable film, the base layer (B) of polyethylene terephthalate was modified with 7.5% by weight of titanium dioxide white pigment. The titanium dioxide was added via a masterbatch from Sukano (Schindellegi (Switzerland)). The masterbatch was composed of polyethylene terephthalate and 50% by weight of titanium dioxide (average titanium dioxide particle diameter approx. 0.3 µm). Chips of polyethylene terephthalate and the masterbatch were dried at 160° C. to a residual moisture content of less than 50 ppm and fed to the extruder for the base layer (B). Chips of polyethylene terephthalate and particles were likewise fed to the extruder (twin screw extruder with degassing) for the nonsealable outer layer (C). According to the process conditions listed in the table below, the raw materials were melted and homogenized in the two particular extruders.

In addition, for the heatsealable and peelable outer layer (A), a mixture including polyester I, polyester II and $SiO_2$ particles was prepared. In Table 2, the particular proportions of the dicarboxylic acids and glycols present in the two polyesters I and II in mol % and the particular proportions of the components present in the mixture in % by weight are specified. The mixture was fed to the twin screw extruder with degassing for the sealable and peelable outer layer (A). According to the process conditions listed in the table below, the raw materials were melted and homogenized in the twin screw extruder.

The three melt streams were then layered one on top of the other by coextrusion in a three-layer die and ejected via the die lip. The resulting melt film was cooled and a white, three-layer film having ABC structure in a total thickness of 25 μm was subsequently produced by stepwise orientation in longitudinal and transverse direction. The thickness of the outer layer (A) is 3.9 μm. The thickness of the outer layer (C) is 1.1 μm. (cf. Also Table 2).

Outer layer (A), mixture of:

50% by weight of polyester I (= copolymer of 78 mol % of ethylene terephthalate, 22 mol % of ethylene isophthalate) having an SV value of 850. The glass transition temperature of polyester I is approx. 75° C. Polyester I additionally contains 10.0 % by weight of SYLYSIA ® (synthetic $SiO_2$, Fuji, Japan) having a particle diameter of $d_{50}$ = 4.5 μm and a SPAN98 of 1.8. The ratio of particle diameter $d_{50}$ to outer layer thickness $d_{(A)}$ is 1.15:1 (cf. Table 2);
50% by weight of polyester II (copolymer containing 40 mol % of ethylene azelate, 50 mol % of ethylene terephthalate, 10 mol % of ethylene isophthalate) having an SV value of 1000. The glass transition temperature of polyester II is approx. 0° C.

Base layer (B):

85% by weight of polyethylene terephthalate having an SV value of 800;
15% by weight of masterbatch from Sukano (Schindellegi (Switzerland)) having 50% by weight of titanium dioxide (average titanium dioxide particle diameter approx. 0.3 μm) and 50% by weight of PET.

Outer layer (C), mixture of:

85% by weight of polyethylene terephthalate having an SV value of 800;
15% by weight of masterbatch of 99% by weight of polyethylene terephthalate (SV value of 800) and 1.0% by weight of SYLOBLOC ® 44 H (synthetic $SiO_2$, Grace, Worms), $d_{50}$ = 2.5 μm, SPAN98 = 1.9.

The production conditions in the individual process steps were:

| Extrusion | Temperatures | Layer A: | 230 | ° C. |
|---|---|---|---|---|
| | | Layer B: | 280 | ° C. |
| | | Layer C: | 280 | ° C. |
| | Temperature of the takeoff roll | | 20 | ° C. |
| Longitudinal stretching | Heating temperature | | 70–100 | ° C. |
| | Stretching temperature | | 102 | ° C. |
| | Longitudinal stretching ratio | | 4.1 | |
| Transverse stretching | Heating temperature | | 100 | ° C. |
| | Stretching temperature | | 135 | ° C. |
| | Transverse stretching ratio | | 4.0 | |
| Setting | Temperature | | 230 | ° C. |
| | Time | | 3 | s |

Table 3 shows the properties of the white film. According to measurements (column 2), the minimum sealing temperature of the film with respect to CPET trays is 152° C. The film was sealed to the CPET trays at 160, 180 and 200° C. (sealing pressure 4 bar, sealing time 0.5 s). Subsequently, strips of the bond of inventive film and CPET tray were pulled apart by means of a tensile strain tester in accordance with the aforementioned test method (cf. FIG. 2). For all sealing temperatures, the films exhibited the desired peeling off from the tray according to FIG. 3b. The seal seam strengths measured are listed in column 3 of Tab. 3. For all sealing temperatures, peelable films were obtained. The seal seam strengths are within the lower range, i.e. the films can be removed from the tray without any force being applied. In addition, the film had the desired good optical properties, exhibited the desired handling and the desired processing performance.

EXAMPLE 2

In comparison to Example 1, the composition of the mixture for the sealable outer layer (A) was changed. The composition of the individual components remained unchanged in comparison to Example 1. The mixture now includes the following raw material proportions:

Polyester I =40% by weight

Polyester II =60% by weight

As a consequence of the higher proportion of polyester II in the mixture, the process parameters in the longitudinal stretching were modified. The new conditions for the longitudinal stretching are listed in the table below.

| Longitudinal stretching | Heating temperature | 70–95 | ° C. |
|---|---|---|---|
| | Stretching temperature | 97 | ° C. |
| | Longitudinal stretching ratio | 3.7 | |

The minimum sealing temperature of the white film with respect to CPET trays is now 150° C. For all sealing temperatures, the films exhibited the desired peeling off from the tray according to FIG. 3b. The seal seam strengths measured are listed in column 3. For all sealing temperatures, peelable films were again obtained. The seal seam strengths of the inventive films are higher than in Example 1. They are within a medium range, so that the film can be removed from the tray without applying significant force. The optical properties, the handling and the processing performance of the film were as in Example 1.

EXAMPLE 3

In comparison to Example 2, the titanium dioxide white pigment was replaced by 18% by weight of barium sulfate (BLANC FIXE® XR-HX, Sachtleben Chemie, Germany) and 216 ppm of optical brightener (TINOPAL®, Ciba-Geigy, Basle). The barium sulfate and the optical brightener were added as a masterbatch. The masterbatch was composed of polyethylene terephthalate, 50% by weight of barium sulfate and 600 ppm of optical brightener. Chips of polyethylene terephthalate and the masterbatch were dried at 160° C. to a residual moisture content of less 50 ppm and fed to the extruder for the base layer (B).

Base layer (B):

64% by weight of polyethylene terephthalate having an SV value of 800
36% by weight of masterbatch having 50% by weight of barium sulfate (BLANC FIXE ® XR-HX, Sachtleben) and 600 ppm of optical brightener (TINOPAL ®, Ciba-Geigy, Basle), remainder = PET.

In addition, the composition of the mixture for the sealable outer layer (A) was changed in comparison to Example 2. The composition of the individual components remained unchanged in comparison to Example 1. The mixture now includes the following raw material proportions:
Polyester I=30% by weight
Polyester II=70% by weight As a consequence of the higher proportion of polyester II in the mixture, the process parameters in the longitudinal stretching were modified. The new conditions for the longitudinal stretching are listed in the table below.

| Longitudinal stretching | Heating temperature | 70–90 | °C. |
| | Stretching temperature | 93 | °C. |
| | Longitudinal stretching ratio | 3.5 | |

The minimum sealing temperature of the white film with respect to CPET trays is now 149° C. For all sealing temperatures, the films exhibited the desired peeling off from the tray according to FIG. 3b. The seal seam strengths measured are listed in column 3. For all sealing temperatures, peelable films were again obtained. The seal seam strengths of the inventive films are comparable to Example 1. The white film exhibits a high whiteness and a very low transparency. The handling and the processing performance of the film were as in Example 1.

EXAMPLE 4

In comparison to Example 3, the composition of polyester II for the sealable outer layer (A) was changed. The mixture used in outer layer (A) now includes the following raw material proportions:

| 20% by weight | of polyester I, identical to Example 1 |
| 80% by weight | of polyester II, VITEL ® 1912 (polyester, Bostik-Findley, USA; contains the dicarboxylic acid constituents azelaic acid, sebacic acid, terephthalic acid, isophthalic acid and further dicarboxylic acids in a molar ratio of about 40/1/45/10/4 and, as the diol component, at least 60 mol % of ethylene glycol). The glass transition temperature of polyester II is approx. −1° C. |

The process parameters in the longitudinal stretching corresponded to those in Example 3. The minimum sealing temperature of the white film produced in accordance with the invention with respect to CPET trays is now 138° C. For all sealing temperatures, the films exhibited the desired peeling off from the tray according to FIG. 3b. The seal seam strengths measured are listed in column 3. For all sealing temperatures, peelable films were again obtained. They are within a medium range, so that the film can be removed from the tray without great force being applied. The optical properties, the handling and the processing performance of the film were as in Example 3.

EXAMPLE 5

In comparison to Example 2, the titanium dioxide white pigment in the base layer (B) was replaced by a combination of a polymer incompatible with polyester (anti-PET polymer), barium sulfate and an optical brightener.

Chips of polyethylene terephthalate were dried at 160° C. to a residual moisture content of less than 50 ppm and fed to the extruder for the base layer (B). In addition, chips of cycloolefin copolymers (COC) from Ticona, Frankfurt: TOPAS® 6015 (COC including 2-norbornene and ethylene, see also W. Hatke: Folien aus COC [COC Films], Kunststoffe 87 (1997) 1, p. 58-62) having a glass transition temperature $T_g$ of 160° C. were likewise fed to the extruder for the base layer (B). The COC chips are not fed to the extruder for the base layer (B) via the drying process customary for polyester, but rather the dried polyester terephthalate chips are metered by means of a side feeder immediately upstream of the extruder intake zone. The quantitative proportion of the COC in the base layer (B) was 10% by weight.

In addition, the base layer (B) contained 2.5% by weight of barium sulfate (BLANC FIXE® XR-HX, Sachtleben Chemie) and 100 ppm of optical brightener (®Tinopal, Ciba-Geigy, Basle). The barium sulfate and the optical brightener were added as a masterbatch. The masterbatch was composed of polyethylene terephthalate, 50% by weight of barium sulfate and 2000 ppm of optical brightener. Chips of the masterbatch were dried at 160° C. to a residual moisture content of less than 50 ppm and fed to the extruder for the base layer (B).

| Base layer (B): | |
| --- | --- |
| 85% by weight | of polyethylene terephthalate having an SV value of 800 |
| 10% by weight | of cycloolefin copolymers (COC) from Ticona, Frankfurt: TOPAS ® 6015 |
| 5% by weight | of masterbatch having 50% by weight of barium sulfate (BLANC FIXE ® XR-HX, Sachtleben Chemie) and 2000 ppm of optical brightener (TINOPAL ®, Ciba-Geigy, Basle) |

The composition of the mixture for the sealable outer layer (A) and the process parameters remained unchanged in comparison to Example 2.

The minimum sealing temperature of the white film with respect to CPET trays is 150° C. For all sealing temperatures, the films exhibited the desired peeling off from the tray according to FIG. 3b. The seal seam strengths measured are listed in column 3. For all sealing temperatures, peelable films were again obtained. The seal seam strengths of the inventive films are higher than in Example 1. They are within a medium range, so that the film can be removed from the tray without significant force being applied. The white film exhibits a high whiteness and a low transparency. The handling and the processing performance of the film were as in Example 1.

COMPARATIVE EXAMPLE 1

In comparison to Example 1, the composition of the sealable layer (A) was changed. In the outer layer (A) only the polyester I formed from aromatic acids was used:

| Outer layer (A): | |
| --- | --- |
| 100% by weight | of polyester I (= copolymer of 78 mol % of ethylene terephthalate and 22 mol % of ethylene isophthalate) having an SV value of 850. The glass transition temperature of polyester I is approx. 75° C. Polyester I additionally contains 5.0% SYLYSIA ®. |

The production conditions in the individual process steps were adjusted in the longitudinal stretching to the glass transition temperature of the outer layer raw material:

| Longitudinal stretching | Heating temperature | 70–115 °C. |
| --- | --- | --- |
| | Stretching temperature | 120 °C. |
| | Longitudinal stretching ratio | 4.0 |

Table 3 shows the properties of the film. Even though the sealing layer is highly pigmented and the pigments constitute weak points in the sealing layer, a peelable film was not obtained for any of the sealing temperatures specified. When the film was removed from the tray, the film started to tear directly and exhibited a force-distance diagram according to FIG. 3a. The film exhibits weldable behavior and is thus unsuitable for the achievement of the object specified.

COMPARATIVE EXAMPLE 2

Example 3 (white sealable film) from EP-B-0 515 096 was reproduced. Table 3 shows the properties of the film. A peelable film was not obtained for any of the sealing temperatures specified. When the film was removed from the tray, the film started to tear directly and exhibited a diagram according to FIG. 3a. The film exhibits weldable behavior and is thus unsuitable for the achievement of the object specified.

COMPARATIVE EXAMPLE 3

Example 5 from EP-A-0 035 835 was reproduced. This film was transparent. Table 3 shows the properties of the film. A peelable film was not obtained for any of the sealing temperatures specified. When the film was removed from the tray, the film started to tear directly and exhibited a force-distance diagram according to FIG. 3a. The film exhibits weldable behavior and is thus unsuitable for the achievement of the object specified.

COMPARATIVE EXAMPLE 4

Example 1 from EP-A-0 379190 was reproduced. This film was transparent. Table 3 shows the properties of the film. A peelable film was not obtained for any of the sealing temperatures specified. When the film was removed from the tray, the film started to tear directly and exhibited a force-distance diagram according to FIG. 3a. The film exhibits weldable behavior and is thus unsuitable for the achievement of the object specified.

COMPARATIVE EXAMPLE 5

Example 22 from EP-A-0 379190 was reproduced. This film was transparent. Table 3 shows the properties of the film. A peelable film was not obtained for any of the sealing temperatures specified. When the film was removed from the tray, the film started to tear directly and exhibited a force-distance diagram according to FIG. 3a. The film exhibits weldable behavior and is thus unsuitable for the achievement of the object specified.

The composition of the films is summarized in Table 2, the measured film properties in Table 3.

TABLE 2

| | | Composition of polyester I | | | | Composition of polyester II | | | | | | | | PI/PII/ |
| --- | --- | --- | --- | --- | --- | --- | --- | --- | --- | --- | --- | --- | --- | --- |
| | | TA | IA | EG | NG | AzA | SeA | AdA | TA | IA | EG | BD | FA | ratios |
| | | mol % | | | | | | | mol % | | | | | % by wt. |
| Examples | 1 | 78 | 22 | 100 | | 40 | | | 50 | 10 | 100 | | | 50/50 |
| | 2 | 78 | 22 | 100 | | 40 | | | 50 | 10 | 100 | | | 40/60 |
| | 3 | 78 | 22 | 100 | | 40 | | | 50 | 10 | 100 | | | 30/70 |
| | 4 | 78 | 22 | 100 | | 40 | 1 | | 45 | 10 | >60 | | 4 | 20/80 |
| | 5 | 78 | 22 | 100 | | 40 | | | 50 | 10 | 100 | | | 40/60 |
| Comparative | 1 | 78 | 22 | 100 | | — | — | — | — | — | — | — | — | 100/0/0/ |
| Examples | 2 | 82 | 18 | 100 | | — | — | — | — | — | — | — | — | 100/0/0/ |
| | 3 | 82 | 18 | 100 | | — | — | — | — | — | — | — | — | 100/0/0/ |
| | 4 | — | — | — | | 10 | | | 90 | | 100 | | | 0/100/0/ |
| | 5 | 100 | — | 85 | 15 | — | 31.5 | 2.4 | 65 | 1.1 | 95.4 | 4.6 | | 50/50/0/ |

| | | PI/PII glass transition temperatures °C. | Film structure | Film thickness µm | Outer layer thicknesses | | Particles in (A) | | | |
| --- | --- | --- | --- | --- | --- | --- | --- | --- | --- | --- |
| | | | | | (A) µm | (C) µm | Diameter µm | SPAN 98 — | Concentration % by wt. | $d_{50}/d_{(A)}$ ratio |
| Examples | 1 | 75/0 | ABC | 25 | 3.9 | 1.1 | 4.5 | 1.8 | 5.00 | 1.15 |
| | 2 | 75/0 | ABC | 25 | 3 | 1.1 | 4.5 | 1.8 | 4.00 | 1.50 |
| | 3 | 75/0 | ABC | 25 | 3.3 | 1.1 | 4.5 | 1.8 | 3.00 | 1.36 |
| | 4 | 75/−1 | ABC | 25 | 3.4 | 1.1 | 4.5 | 1.8 | 2.00 | 1.32 |
| | 5 | 75/0 | ABC | 25 | 3 | 1.1 | 4.5 | 1.8 | 4.00 | 1.50 |
| Comparative | 1 | 75 | ABC | 25 | 3.9 | 1.1 | 4.5 | 1.8 | 5 | 1.15 |
| Examples | 2 | 75 | AB | 250 | 40 | — | 0.04 | — | — | <<1 |
| | 3 | 75 | AB | 20 | 2.98 | — | 1.5 + 5 | — | 0.3 | 1.68 |
| | 4 | approx. 50 | AB | 17.2 | 4.1 | — | — | — | — | — |
| | 5 | approx. 20 | AB | 11.5 | 2.5 | — | 2 | — | 0.25 | 0.8 |

TA terephthalate, IA isophthalate, EG ethylene, BD butane, NG neopentylglycol
AzA azelate, SeA sebacate, AdA adipate, FA further dicarboxylic acids and glycols

TABLE 3

|  | | Tray | Minimum sealing temperature °C | Seal seam strength with respect to trays | | | Peel test (= peeling performance) | Whiteness | Transparency % | Roughness $R_a$ | |
|---|---|---|---|---|---|---|---|---|---|---|---|
|  | | | | 160° C. | 180° C. N/15 mm | 200° C. | | | | Side A nm | Side C nm |
| Examples | 1 | CPET | 152 | 1.7 | 2.4 | 4.4 | ++++ | 72 | 50 | 196 | 60 |
|  | 2 | CPET | 150 | 2.1 | 3.8 | 7.1 | ++++ | 72 | 50 | 162 | 60 |
|  | 3 | CPET | 149 | 1.5 | 2.6 | 5.1 | ++++ | 85 | 30 | 173 | 60 |
|  | 4 | CPET | 138 | 4.8 | 4.7 | 6.1 | ++++ | 85 | 30 | 186 | 60 |
|  | 5 | CPET | 150 | 2.1 | 3.8 | 7.1 | ++++ | 77 | 40 | 162 | 60 |
| C-Examples | 1 | CPET | 105 | 3.5 | 5.0 | 8.0 | − | 72 | 50 | 310 | 60 |
|  | 2 | CPET | 109 | 15.0 | 18.0 | 23.0 | − | 103 | 12 | 25 | 50 |
|  | 3 | CPET | 109 | 4.2 | 5.5 | 8.1 | − | — | — | 69 | 25 |
|  | 4 | CPET | 112 | 2.0 | 4.0 | 6.0 | − | — | — | 33 | 20 |
|  | 5 | CPET | 110 | 3.0 | 4.0 | 5.0 | − | — | — | 120 | 22 |

Peel test:
++++: At all sealing temperatures, film is peeled from the tray without the film starting or continuing to tear. Impeccable, smooth, clean peeling of the film from the tray, even within the upper temperature range at high seal seam strength.
−: At all sealing temperatures, the film starts to tear on removal from the tray.

The invention claimed is:

1. A coextruded, biaxially oriented polyester film which has a white base layer (B) and has a heatsealable outer layer (A) that can be peeled from APET/CPET and from CPET, where the outer layer (A) comprises a) from 80 to 99% by weight of polyester and b) from 1 to 10% by weight of inorganic and/or organic particles with a median diameter $d_{50}$ of from 2.5 to 12.0 µm, and where c) the polyester is composed of from 12 to 89 mol % of units derived from at least one aromatic dicarboxylic acid and of from 11 to 88 mol % of units derived from at least one aliphatic dicarboxylic acid, where the total of the dicarboxylic-acid-derived molar percentages is 100, and d) the ratio calculated from the particle size $d_{50}$ of the particles and the layer thickness $d_A$ of the outer layer (A) is greater than 1, and the base layer (B) comprises an inorganic white pigment and/or a polymer incompatible with polyester, and e) said outer layer (A) exhibits a surface roughness, Ra, ranging from greater than 60 to 400 ηm, as determined via DIN 4768.

2. The polyester film as claimed in claim 1, wherein the thickness of the outer layer (A) $d_A$ is from 0.7 to 10 µm.

3. The polyester film as claimed in claim 1, wherein the aromatic dicarboxylic acids have been selected from one or more of the following substances: terephthalic acid, isophthalic acid, and 2,6-naphthalenedicarboxylic acid.

4. The polyester film as claimed in claim 1, wherein the aliphatic dicarboxylic acids have been selected from one or more of the following substances: succinic acid, pimelic acid, suberic acid, azelaic acid, sebacic acid, glutaric acid, and adipic acid.

5. The polyester film as claimed in claim 1, wherein the polyester of the outer layer (A) contains from 12 to 89 mol % of terephthalate, from 0 to 25 mol % of isophthalate, from 11 to 88 mol % of azelate, from 0 to 50 mol % of sebacate, from 0 to 50 mol % of adipate, and more than 30 mol % of ethylene or butylene, based in each case on total dicarboxylate and, respectively, total amount of alkylene.

6. The polyester film as claimed in claim 1, wherein the outer layer (A) has a minimum sealing temperature of not more than 165° C. for sealing against APET/CPET or CPET trays.

7. The polyester film as claimed in claim 1, wherein the outer layer (A) has a seal seam strength of at least 1 N/15 mm of film width against APET/CPET or CPET trays.

8. The polyester film as claimed in claim 1, wherein the polyester of the outer layer (A) is prepared from two polyesters I and II.

9. The polyester film as claimed in claim 8, wherein the polyester I is composed of one or more aromatic dicarboxylates and of one or more aliphatic alkylenes.

10. The polyester film as claimed in claim 8, wherein the polyester I contains terephthalate units, isophthalate units, and ethylene units.

11. The polyester film as claimed in claim 8, wherein the proportion of the polyester I in the outer layer (A) is from 0 to 50% by weight.

12. The polyester film as claimed in claim 8, wherein the polyester I has a glass transition temperature above 50° C.

13. The polyester film as claimed in claim 8, wherein the polyester II is composed of one or more aliphatic dicarboxylates and of one or more aromatic dicarboxylates, and of one or more aliphatic alkylenes.

14. The polyester film as claimed in claim 8, wherein the polyester II contains azelate units, terephthalate units, isophthalate units, and ethylene units.

15. The polyester film as claimed in claim 8, wherein the proportion of the polyester II in the outer layer (A) is from 50 to 100% by weight.

16. The polyester film as claimed in claim 8, wherein the polyester II has a glass transition temperature below 20° C.

17. The polyester film as claimed in claim 1, which has three layers and has an A-B-C structure.

18. The polyester film as claimed in claim 1, wherein the outer layer (C) also comprises inorganic or organic particles.

19. The polyester film as claimed in claim 1, wherein the particles in the outer layer (A) have a SPAN 98 of ≦2.0.

20. The polyester film as claimed in claim 1, wherein the base layer (B) is composed of at least 80% by weight of thermoplastic polyester.

21. The polyester film as claimed in claim 1, wherein the base layer (B) contains terephthalate units and/or isophthalate units, and ethylene units.

22. The polyester film as claimed in claim 1, wherein the base layer (B) comprises, as white pigment, titanium dioxide or barium sulfate.

23. The polyester film as claimed in claim 1, wherein the base layer (B) comprises, as polymer incompatible with polyester, a cycloolefin copolymer.

24. The polyester film as claimed in claim 1, wherein the whiteness of the film is greater than 60 and the transparency of the film is smaller than 60%.

25. A process for producing a polyester film as claimed in claim 1, encompassing the steps of
   a) producing a multilayer film via coextrusion, and shaping of the melts to give flat melt films,
   b) biaxial stretching of the film, and
   c) heat-setting of the stretched film.

26. Packaging material comprising a polyester film as claimed in claim 1.

27. Packaging material according to claim 26, wherein said packaging material is packaging material for foods and other consumable items, or as lid film for APET/CPET or CPET trays.

28. The polyester film as claimed in claim 1, wherein the film exhibits a shrinkage of less than 3% in both directions.

* * * * *